US012748390B2

(12) United States Patent
Hou et al.

(10) Patent No.: US 12,748,390 B2
(45) Date of Patent: Sep. 29, 2026

(54) LINER HANGER OPERATIONS FRAMEWORK

(71) Applicant: Schlumberger Technology Corporation, Sugar Land, TX (US)

(72) Inventors: Tianjun Hou, Clamart (FR); Minyue Liu, Houston, TX (US); Steven Michael Virost, Lawrence, KS (US)

(73) Assignee: Schlumberger Technology Corporation, Sugar Land, TX (US)

( * ) Notice: Subject to any disclaimer, the term of this patent is extended or adjusted under 35 U.S.C. 154(b) by 340 days.

(21) Appl. No.: 18/423,388

(22) Filed: Jan. 26, 2024

(65) Prior Publication Data

US 2024/0255899 A1 Aug. 1, 2024

Related U.S. Application Data

(60) Provisional application No. 63/441,779, filed on Jan. 28, 2023.

(51) Int. Cl.
*G05B 13/02* (2006.01)
*G06N 5/04* (2023.01)

(52) U.S. Cl.
CPC ........... *G05B 13/0265* (2013.01); *G06N 5/04* (2013.01)

(58) Field of Classification Search
CPC ........ G05B 13/0265; G06N 5/04; E21B 33/04
See application file for complete search history.

(56) References Cited

U.S. PATENT DOCUMENTS

2014/0309936 A1 10/2014 Abbassian
2019/0114544 A1* 4/2019 Sundaram ......... G06F 18/24133
2019/0324166 A1* 10/2019 Lolla ...................... G01V 1/288
2020/0362686 A1 11/2020 Puwanto
2021/0406792 A1 12/2021 Bhardwaj
2022/0090485 A1 3/2022 Boguslawski

FOREIGN PATENT DOCUMENTS

WO 2020191360 A1 9/2020
WO WO-2022235481 A1 * 11/2022 ........... E21B 47/095

OTHER PUBLICATIONS

Ronneberger, O. et al., “U-Net: Convolutional Networks for Biomedical Image Segmentation”, Computer Science Department and BIOSS Centre for Biological Signalling Studies, May 18, 2015, 8 pages.

* cited by examiner

*Primary Examiner* — Kenneth M Lo
(74) *Attorney, Agent, or Firm* — Kyle R. Milller

(57) ABSTRACT

A method may include receiving data from field equipment during performance of a liner hanger job at a wellsite; generating an inference as to an occurrence of an event associated with the performance of the liner hanger job based on at least a portion of the data using one or more machine learning models; and controlling the performance of the liner hanger job based at least in part on the inference.

20 Claims, 11 Drawing Sheets

600

LINER HANGER OPERATIONS FRAMEWORK

RELATED APPLICATION

This application claims priority to and the benefit of a U.S. Provisional Application having Ser. No. 63/441,779, filed 28 Jan. 2023, which is incorporated herein in its entirety.

BACKGROUND

Various types of equipment may be utilized in a subterranean environment. As an example, a liner hanger may be utilized to attach or hang one or more liners from an internal wall of a casing in a well in a subterranean environment.

SUMMARY

A method may include receiving data from field equipment during performance of a liner hanger job at a wellsite; generating an inference as to an occurrence of an event associated with the performance of the liner hanger job based on at least a portion of the data using one or more machine learning models; and controlling the performance of the liner hanger job based at least in part on the inference. A system may include one or more processors; memory accessible to at least one of the one or more processors; processor-executable instructions stored in the memory and executable to instruct the system to: receive data from field equipment during performance of a liner hanger job at a wellsite; generate an inference as to an occurrence of an event associated with the performance of the liner hanger job based on at least a portion of the data using one or more machine learning models; and control the performance of the liner hanger job based at least in part on the inference. One or more computer-readable storage media may include processor-executable instructions to instruct a computing system to: receive data from field equipment during performance of a liner hanger job at a wellsite; generate an inference as to an occurrence of an event associated with the performance of the liner hanger job based on at least a portion of the data using one or more machine learning models; and control the performance of the liner hanger job based at least in part on the inference. Various other apparatuses, systems, methods, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations may be more readily understood by reference to the following description taken in conjunction with the accompanying drawings.

DETAILED DESCRIPTION

Figure 1:
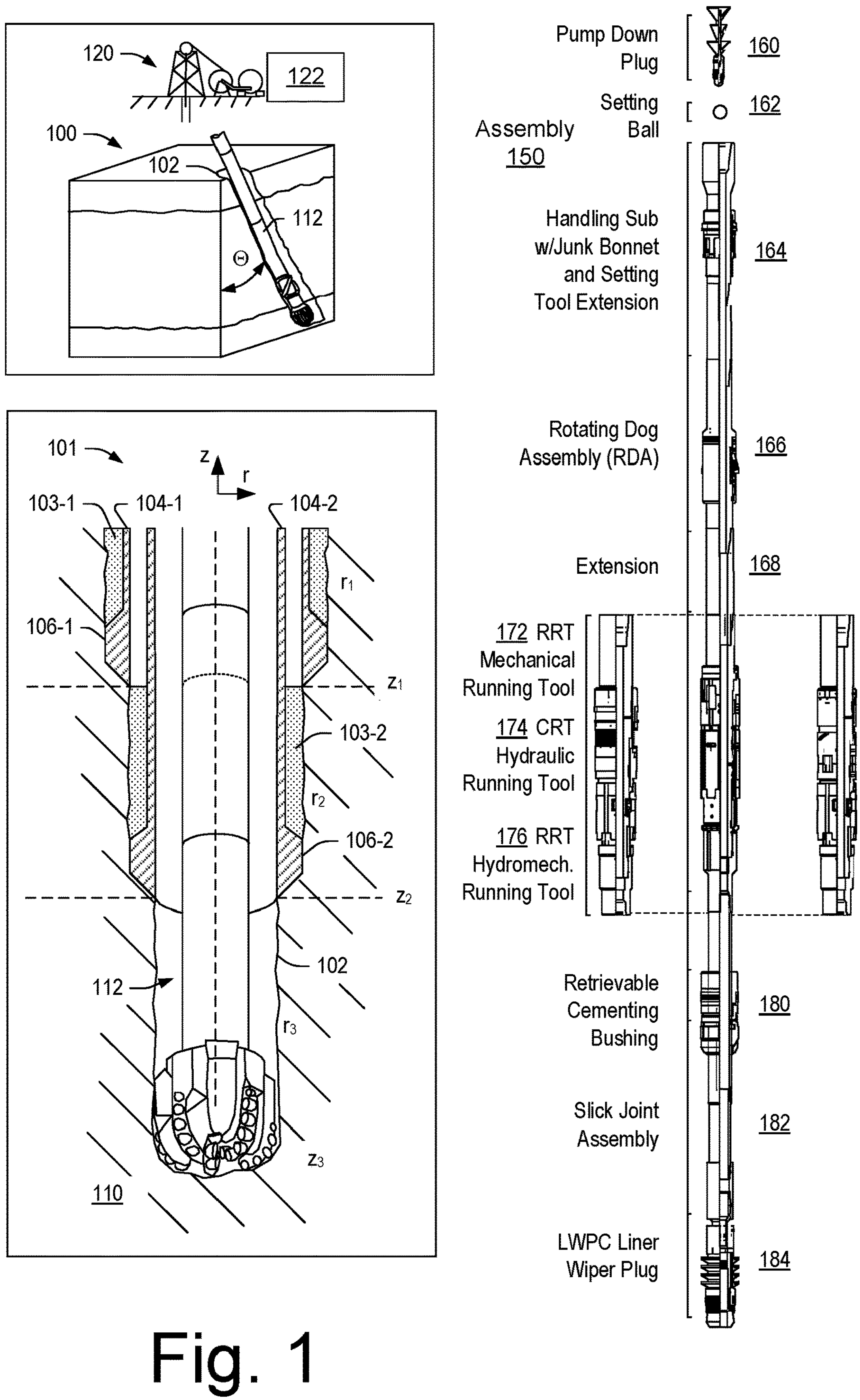
FIG. 1 illustrates examples of an environment, equipment and an assembly.

The following description includes the best mode presently contemplated for practicing the described implementations. This description is not to be taken in a limiting sense, but rather is made merely for the purpose of describing the general principles of the implementations. The scope of the described implementations should be ascertained with reference to the issued claims.

As mentioned, various types of equipment may be utilized in a subterranean environment. An example of such equipment is a liner hanger, which may be utilized to attach or hang one or more liners from an internal wall of a casing in a well in a subterranean environment. A liner may be a string of casing in which the top does not extend to the surface but instead is suspended from inside another casing string. As an example, a liner hanger may be used to attach or hang one or more liners from an internal wall of another casing string.

As an example, a method may include operating one or more components of a liner hanger system. As an example, a lower completion may be a portion of a well that is at least in part in a production zone or an injection zone. As an example, a liner hanger system may be implemented to perform one or more operations associated with a lower completion, for example, including setting one or more components of a lower completion, etc. As an example, a liner hanger system may anchor one or more components of a lower completion to a production casing string.

One or more pieces of equipment, which may be an assembly or a system, may include one or more mechanisms that may be actuated. A mechanism may be actuated to transition from a first state to a second state. As an example, a mechanism may be actuated (e.g., actuatable) via fluid pressure. For example, fluid pressure in a tubular (e.g., a tubular body) may be increased and/or decreased to actuate a mechanism. A mechanism may be a biased mechanism such as, for example, a spring-biased mechanism where potential energy stored in one or more springs may be released as kinetic energy to cause one or more components to move.

As an example, a liner hanger may include a hoop stress hydraulic trigger or triggers. Liner hangers are tools that find use in oil and gas completions for hanging a liner in a casing. A liner hanger may be classified as being mechanical or hydraulic as to actuation of a setting mechanism (e.g., a slip-based setting mechanism).

A hydraulic set liner hanger may include a tubular body that includes one or more openings in its tubular wall such that fluid pressure may be communicated from an interior space to an exterior space and/or vice versa. A hydraulic set liner hanger may have an ability to prevent a liner hanger from premature setting while manipulating the tool string in to a well, which is a type of risk that may exist for a mechanical set liner hanger. For example, fluid pressure may be controlled to assure that fluid pressure does not rise to a level sufficient to trigger an actuator of a setting mechanism (e.g., a slip-based setting mechanism). A mechanical set liner hanger may be without penetration(s) in a tubular body and, thus, without a seal stack to maintain pressure integrity.

As an example, a liner hanger framework may provide for real-time liner hanger job monitoring, for example, to control one or more field operations. In such an example, the framework may include one or more machine learning models, which may include, for example, a deep learning neural network model, which may be a convolution neural network (CNN) or another type of neural network model.

As explained, a liner hanger system may be utilized in an effort to reduce costs and minimize risks in various well construction applications, enhancing well performance across the lifecycle. To ensure the proper installation of a liner hanger, a series of activities are performed. During such activities, a framework may provide for monitoring a liner hanger installation job, for example, using surface data. Such a framework may provide for liner hanger job monitoring in a data-based manner, for example, where a machine learning model (ML model) is trained using data, which may include data from prior jobs and, for example, involvement of one or more experts (e.g., for training, testing, feedback, labeling, etc.). In such an example, the framework may include one or more trained ML models that may reduce time and resource demands in the field. For example, a framework may reduce reliance on engineer expertise, noting that availability of an engineer may otherwise be a factor in performing various actions in the field.

As an example, a framework may include decomposing a liner hanger installation job into a number of events. For example, consider decomposition into approximately eight events where a deep learning neural network-based feature of the framework may monitor the events using surface data (e.g., data acquired at a surface location where surface equipment may be utilized to perform actions and/or instruct, trigger, etc., downhole equipment to perform actions). Such an approach may provide for real-time automatic monitoring of a liner hanger installation job, increase operational reliability, reduce field engineer manual workload, and reduce risks of rig time-consuming troubleshooting installation problems.

As an example, a liner hanger job event detection problem may be modeled as a classification problem: $F(S(t), S_1(t), S_2(t)) \rightarrow E(t)$, where $S(t)$ is the surface data (e.g., block height, hook load, etc.) at time t, $S_1(t)$, $S_2(t)$ are their first and second order derivatives, $E(t)$ is the interpretation of events (e.g., ball land on seat and hold set pressure, set packer, etc.) at time t. In such an approach, $S(t)$, $S_1(t)$, $S_2(t)$ and $E(t)$ may be extracted with a fixed length sliding window along a time dimension. The relationship between the input and the output may be formulated by one or more deep learning neural network models. As an example, consider an approach that may help to ensure accuracy of deep learning models where two architectures may be designed for identifying different events. For example, consider a U-Net based convolutional neural network (UNCNN) and a convolutional neural network (CNN), both of which involve one or more CNNs.

As an example, an ML model may be a classifier that may operate to classify input such as, for example, as being classified as an event, which may be an event class as an output. As an example, a classifier may infer a class based on input where a class may be an event class or a non-event class. As an example, an ML model may be a regression model. As an example, an ML model may provide for prediction of an event where the likelihood of occurrence may be generated as an output based on input (e.g., sensor data, etc.).

As an example of a U-Net architecture, consider the U-Net architecture as described in an article by Ronneberger et al., "U-Net: Convolutional Networks for Biomedical Image Segmentation," arXiv: 1505.04597 (2015), which is incorporated herein by reference in its entirety. Such an architecture includes a contracting path and an expansive path. The article by Ronneberger et al. describes a contracting path that follows an architecture of a convolutional network (e.g., a CNN) and that includes repeated application of convolutions and use of a rectified linear unit (ReLU) along with a max pooling operation with a specified stride for downsampling where, in an expansive path, upsampling of a feature map may be performed followed by convolution.

Specifically, the article by Ronneberger et al. describes a network architecture that includes a contracting path (left side) and an expansive path (right side) where the contracting path follows an architecture type of a convolutional network and includes repeated applications of two 3×3 convolutions (unpadded convolutions), each followed by a rectified linear unit (ReLU) and a 2×2 max pooling operation with stride 2 for downsampling. At each downsampling step, the number of feature channels is doubled. In the article by Ronneberger et al., each step in the expansive path includes an upsampling of the feature map followed by a 2×2 convolution (\up-convolution") that halves the number of feature channels, a concatenation with the correspondingly cropped feature map from the contracting path, and two 3×3 convolutions, each followed by a ReLU. The cropping handles loss of border pixels in each convolution. At the final layer a 1×1 convolution is used to map each 64-component feature vector to the desired number of classes. In total, the network of Ronneberger et al. includes 23 convolutional layers.

As to training, consider an approach of Ronneberger et al., where input images and their corresponding segmentation maps are used to train the network with the stochastic gradient descent implementation of the CAFFE framework. Due to the unpadded convolutions, the output image is smaller than the input by a constant border width. To minimize the overhead and make maximum use of GPU memory, Ronneberger et al. favored large input tiles over a large batch size and hence reduced the batch to a single image where a high momentum (0.99) was utilized such that a large number of the previously seen training samples determined the update in a current optimization step. As explained, one or more other approaches may be utilized for purposes of training, which may train the same type of ML model or one or more other types of ML models.

For monitoring and/or control of field operations in real-time (e.g., or near real-time as associated with equipment operations and workflows), some challenges exist as CNNs generally perform well in non-real-time cases. As an example, a framework may implement a delay mechanism that may address such a CNN characteristic. For example, consider a delay mechanism that allows a deep learning model to output an inference after a full event pattern is fed to the deep learning model. In this way, a CNN-based approach may be operated using a compromise between model timeliness and model accuracy.

In a trial, neural network models were trained with data collected from the field. Accuracy of the models was tested where an intersection over union (IoU) was used as metric. The trial demonstrated that the proposed solution achieved a 90.31 percent IoU score with an average delay of 3.75 seconds, which is a relatively high objective score. Meanwhile, based on a subjective evaluation with field engineers, the result given by the solution proved satisfactory.

Below, various examples of equipment are described along with examples of data, graphical user interfaces, methods, framework components, etc.

Figure 2:
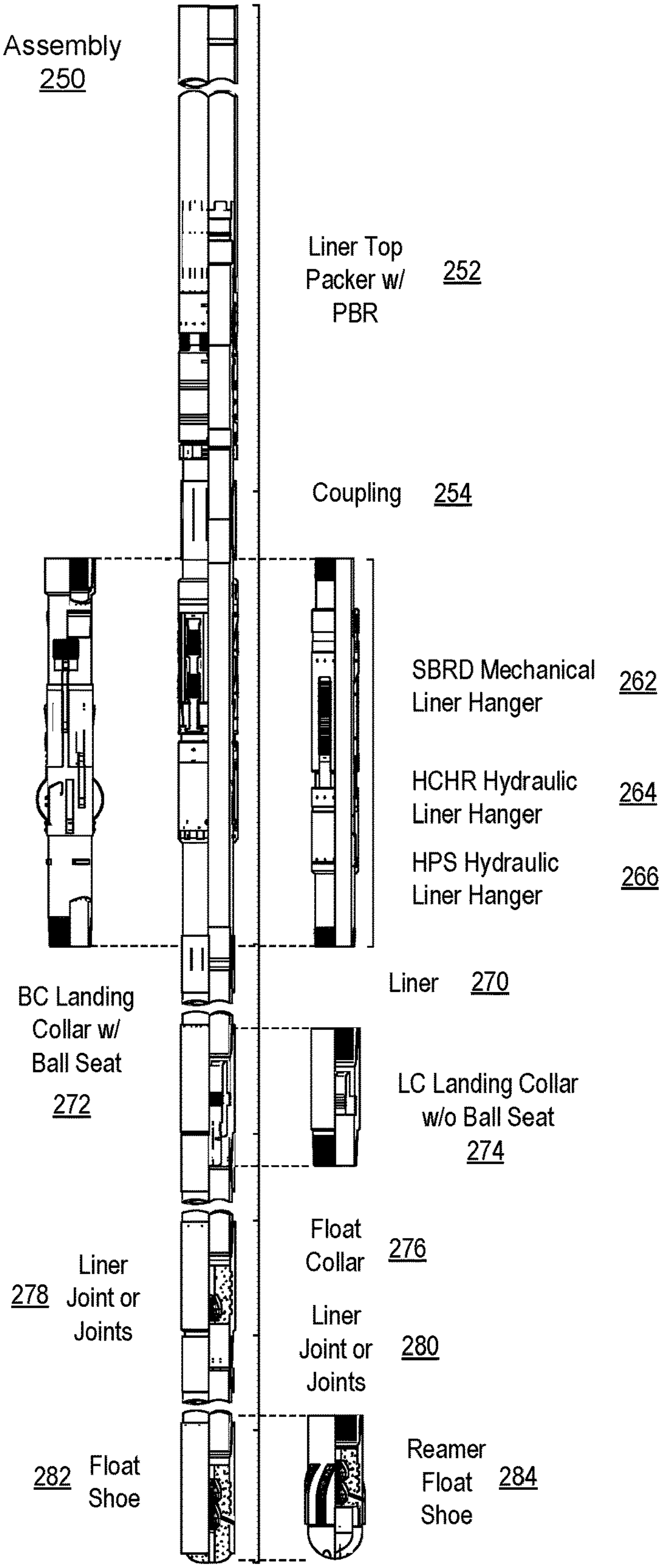
FIG. 2 illustrates an example of an assembly.

FIGS. 1 and 2 show an example of an environment 100, an example of a portion of a completion 101, an example of equipment 120 and examples of assemblies 150 and 250, which may be part of a liner hanger system and/or otherwise involved in one or more well completions operations. As an example, the equipment 120 may include a rig, a turntable, a pump, drilling equipment, pumping equipment, equipment for deploying an assembly, a part of an assembly, etc. (see, e.g., FIG. 3). As an example, the equipment 120 may include one or more controllers 122. As an example, a controller may include one or more processors, memory and instructions stored in memory that are executable by a processor, for example, to control one or more pieces of equipment (e.g., motors, pumps, sensors, etc.). As an example, a controller may include and/or be operatively coupled to a framework, which may include one or more trained ML models. As an example, the equipment 120 may be deployed at least in part at a well site and, optionally, in part at a remote site.

FIG. 1 shows an environment 100 that includes a subterranean formation 110 into which a bore 102 extends where a tool 112 such as, for example, a drill string is disposed in the bore 102. As an example, the bore 102 may be defined in part by an angle (Θ); noting that while the bore 102 is shown as being deviated, it may be vertical (e.g., or include one or more vertical sections along with one or more deviated sections). As shown in an enlarged view with respect to an r, z coordinate system (e.g., a cylindrical coordinate system), a portion of the bore 102 includes casings 104-1 and 104-2 having casing shoes 106-1 and 106-2. As shown, cement annuli 103-1 and 103-2 are disposed between the bore 102 and the casings 104-1 and 104-2. Cement such as the cement annuli 103-1 and 103-2 may support and protect casings such as the casings 104-1 and 104-2 and when cement is disposed throughout various portions of a wellbore such as the bore 102, cement may help achieve zonal isolation.

In the example of FIG. 1, the bore 102 has been drilled in sections or segments beginning with a large diameter section (see, e.g., $r_1$) followed by an intermediate diameter section (see, e.g., $r_2$) and a smaller diameter section (see, e.g., $r_3$). As an example, a large diameter section may be a surface casing section, which may be three or more feet in diameter and extend down several hundred feet to several thousand feet. A surface casing section may aim to prevent washout of loose unconsolidated formations. As to an intermediate casing section, it may aim to isolate and protect high pressure zones, guard against lost circulation zones, etc. As an example, intermediate casing may be set at about 6000 feet (e.g., about 2000 m) and extend lower with one or more intermediate casing portions of decreasing diameter (e.g., in a range from about thirteen to about five inches in diameter). A so-called production casing section may extend below an intermediate casing section and, upon completion, be the longest running section within a wellbore (e.g., a production casing section may be thousands of feet in length). As an example, production casing may be located in a target zone where the casing is perforated for flow of fluid into a bore of the casing.

As mentioned, a liner may be a casing (e.g., a completion component). As mentioned, a liner may be installed via a liner hanger system. As an example, a liner hanger system may include various features such as, for example, one or more of the features of the assembly 150 and/or the assembly 250 of FIGS. 1 and 2.

As shown in FIG. 1, the assembly 150 may include a pump down plug 160, a setting ball 162, a handling sub with a junk bonnet and setting tool extension 164, a rotating dog assembly (RDA) 166, an extension(s) 168, a mechanical running tool 172, a hydraulic running tool 174, a hydromechanical running tool 176, a retrievable cementing bushing 180, a slick joint assembly 182 and/or a liner wiper plug 184.

As shown in FIG. 2, the assembly 250 may include a liner top packer with a polished bore receptacle (PBR) 252, a coupling(s) 254, a mechanical liner hanger 262, a hydraulic liner hanger 264, a hydraulic liner hanger 266, a liner(s) 270, a landing collar with a ball seat 272, a landing collar without a ball seat 274, a float collar 276, a liner joint or joints 278 and/or 280, a float shoe 282 and/or a reamer float shoe 284.

As an example, a method may include setting a liner hanger, releasing a running tool, cementing a liner and setting a liner top packer. As an example, a method may include pumping heavy fluid (e.g., cement) down an annulus from a point above a liner hanger and a liner top packer. In such an example, stress on a formation may be reduced when compared to a method that pumps heavy fluid (e.g., cement) up such an annulus. For example, stress may be reduced as back pressure developed during pumping may be contained in between a casing and a landing string.

As an example, a liner hanger may include a hold down slip that aims to prevent a liner from moving up during a cementing operation or, for example, when loading exists due to fluid pressure (e.g., well kicking) of a formation. For deep offshore wells, loading due to well kicking may be substantial. As an example, a liner hanger may include multiple sets of hold down components. For example, a liner hanger may include two hold down assemblies with separate sets of slips.

As an example, an assembly such as the assembly 150 or the assembly 250 may include a trigger and trigger lock component where the trigger may be a helical strip. As an example, a trigger lock component may be a helical strip or another type of component. As an example, a helical strip positioned exterior to or interior to a tubular body (e.g., an annular cylinder, etc.) may increase or decrease in a number of turns (e.g., total number of degrees) in response to a change in a circumference of a tubular body, which may be due to a change in circumferential stress of the tubular body. Such a change may allow for unlocking of the trigger lock component and the trigger (e.g., unlatching, disengagement, etc.).

While various examples of equipment are shown and described in FIGS. 1 and 2, liner hanging systems may include one or more alternative and/or additional types of equipment, which may be utilized in field operations that may involve performance of one or more alternative and/or additional actions.

Figure 3:
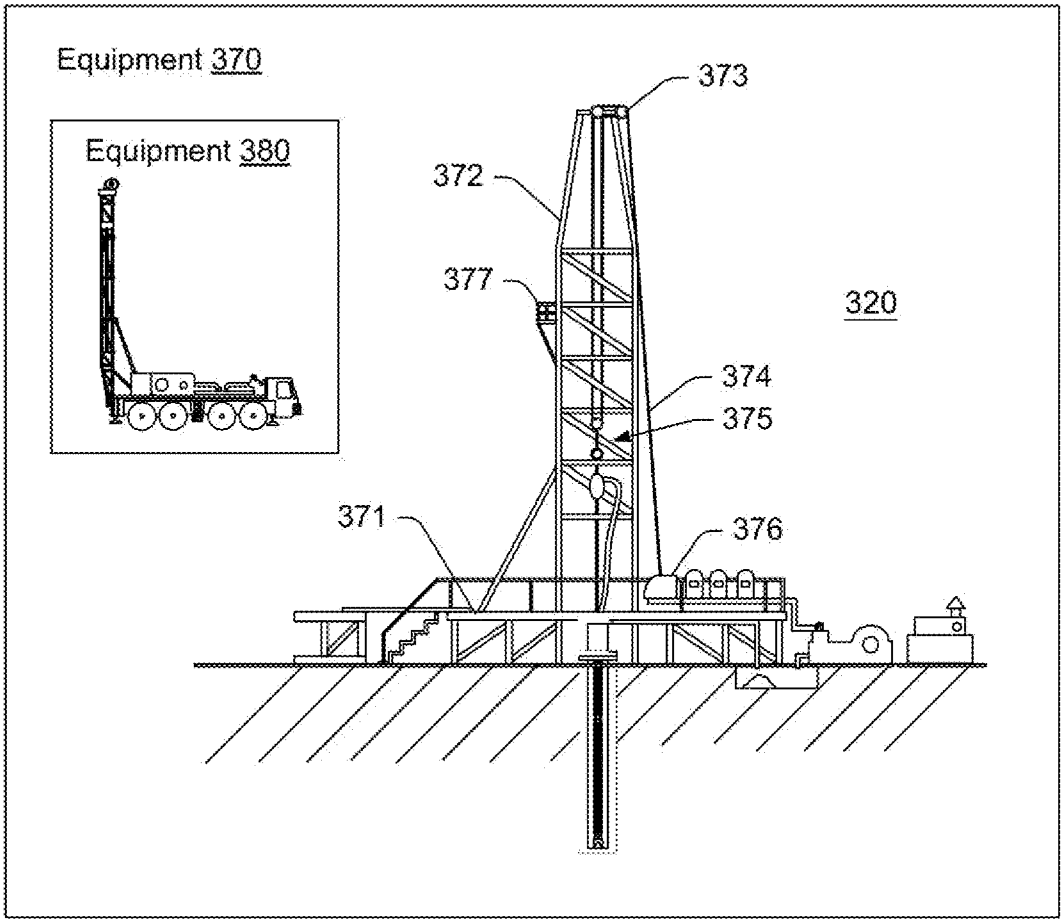
FIG. 3 illustrates examples of equipment.

FIG. 3 also shows an example of equipment 370 and an example of equipment 380. Such equipment, which may be systems of components, may be suitable for use in the geologic environment 320. While the equipment 370 and 380 are illustrated as land-based, various components may be suitable for use in an offshore system. As an example, one or more pieces of equipment as shown in FIG. 3 may be utilized in performing one or more liner hanger related field operations (e.g., field actions, etc.).

The equipment 370 includes a platform 371, a derrick 372, a crown block 373, a line 374, a traveling block assembly 375, drawworks 376 and a landing 377 (e.g., a monkeyboard). As an example, the line 374 may be controlled at least in part via the drawworks 376 such that the traveling block assembly 375 travels in a vertical direction with respect to the platform 371. For example, by drawing the line 374 in, the drawworks 376 may cause the line 374 to run through the crown block 373 and lift the traveling block assembly 375 skyward away from the platform 371; whereas, by allowing the line 374 out, the drawworks 376 may cause the line 374 to run through the crown block 373 and lower the traveling block assembly 375 toward the platform 371. Where the traveling block assembly 375 carries pipe (e.g., casing, etc.), tracking of movement of the traveling block assembly 375 may provide an indication as to how much pipe has been deployed. As an example, the equipment 370 may include one or more pumps or pumping systems. For example, consider a pump that may pump drilling fluid (e.g., mud), cement, etc.

A derrick may be a structure used to support a crown block and a traveling block operatively coupled to the crown block at least in part via line. A derrick may be pyramidal in shape and offer a suitable strength-to-weight ratio. A derrick may be movable as a unit or in a piece-by-piece manner (e.g., to be assembled and disassembled).

As an example, drawworks may include a spool, brakes, a power source and assorted auxiliary devices. Drawworks may controllably reel out and reel in line. Line may be reeled over a crown block and coupled to a traveling block to gain mechanical advantage in a "block and tackle" or "pulley" fashion. Reeling out and in of line may cause a traveling block (e.g., and whatever may be hanging underneath it), to be lowered into or raised out of a bore. Reeling out of line may be powered by gravity and reeling in by a motor, an engine, etc. (e.g., an electric motor, a diesel engine, etc.).

As an example, a crown block may include a set of pulleys (e.g., sheaves) that may be located at or near a top of a derrick or a mast, over which line is threaded. A traveling block may include a set of sheaves that may be moved up and down in a derrick or a mast via line threaded in the set of sheaves of the traveling block and in the set of sheaves of a crown block. A crown block, a traveling block and a line may form a pulley system of a derrick or a mast, which may enable handling of heavy loads (e.g., drillstring, pipe, casing, liners, etc.) to be lifted out of or lowered into a bore. As an example, line may be about a centimeter to about five centimeters in diameter as, for example, steel cable. Through use of a set of sheaves, such line may carry loads heavier than the line could support as a single strand.

As an example, a derrickman may be a rig crew member that works on a platform attached to a derrick or a mast. A derrick may include a landing on which a derrickman may stand. As an example, such a landing may be about 10 meters or more above a rig floor. In an operation referred to as trip out of the hole (TOH), a derrickman may wear a safety harness that enables leaning out from the work landing (e.g., monkeyboard) to reach pipe located at or near the center of a derrick or a mast and to throw a line around the pipe and pull it back into its storage location (e.g., fingerboards), for example, until a time at which it may be desirable to run the pipe back into the bore. As an example, a rig may include automated pipe-handling equipment such that the derrickman controls the machinery rather than physically handling the pipe.

As an example, a trip may refer to the act of pulling equipment from a bore and/or placing equipment in a bore. As an example, equipment may include a drillstring that may be pulled out of a hole and/or placed or replaced in a hole. As an example, a pipe trip may be performed where a drill bit has dulled or has otherwise ceased to drill efficiently and is to be replaced.

Equipment may be instrumented with various sensors, for example, consider a hook load sensor, a standpipe pressure sensor, a block position sensor and a rotational sensor for sensing rotations per minute (e.g., RPM). Such sensors may be at surface and generate surface data. As to standpipe pressure, it may be pressure in a standpipe such as a standpipe that receives fluid from a vibrating hose where a kelly hose may receive the fluid from the standpipe. Fluid may be an appropriate fluid for performing one or more types of operations (e.g., drilling fluid, cement, pills, etc.). As explained, equipment may include one or more pumps or pumping system suitable for pumping one or more types of fluids.

In oil and gas well construction, liner hanger systems may aim to reduce overall operations costs by saving rig time and the usage of casing, cement, etc. Liner hanger systems generally contain a liner and a liner hanger.

As explained, a liner is a section of downhole casing suspended from the inner walls of production casing in the subsurface (e.g., consider a casing bore wall). A liner may offer a variety of advantages in well construction and completion design. For example, it may be used to quickly isolate and support a downhole formation that is susceptible to collapse, it may reduce the total amount of casing needed to complete a well, and it may allow a larger ID casing above the liner to enable a larger completion design. A device used to suspend a liner in a subsurface environment is called a liner hanger, which may use external slips to engage an internal wall of a previously installed casing string. A liner may serve multiple purposes during both drilling and production.

Figure 4:
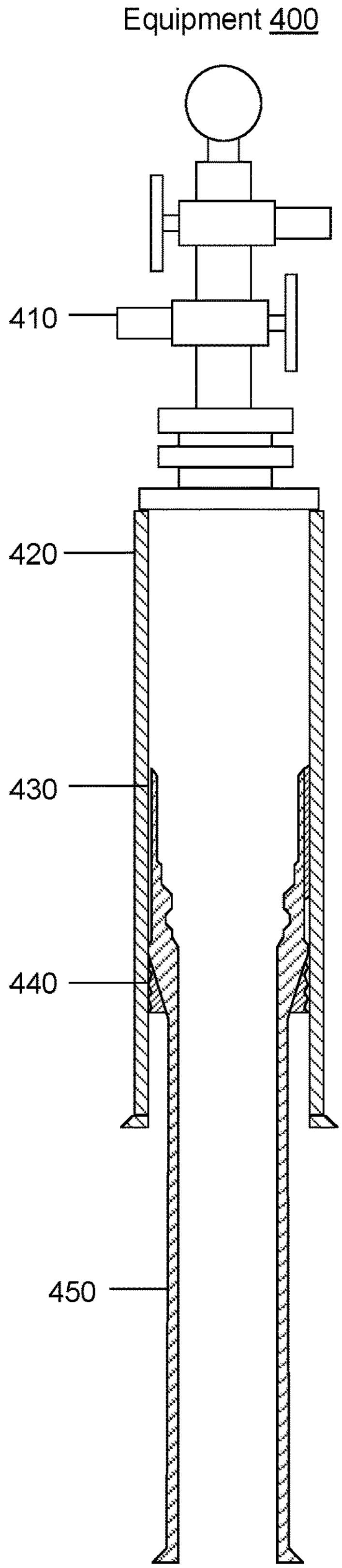
FIG. 4 illustrates examples of equipment.

FIG. 4 shows an example of equipment 400 that includes a well head 410, a casing 420, a liner top 430, a liner hanger system 440 and a liner 450. As shown, the well head 410 may include various components, which may include one or more valves, one or more sensors, etc. As shown, the casing 420 may extend a distance from the well head 410 and the liner hanger system 440 may be disposed within a bore of the casing 420 where the liner 450 may extend below a lowermost portion of the casing 420. As explained, a liner may be hung in a bore of a casing where a liner top (e.g., top of a liner) remains within the bore of the casing.

Appropriate installation of a liner hanger is demanded during well construction. Appropriate installation involves a particular sequence of activities to be performed depending on the liner hanger systems selected. Conventional liner hanger job installation relies heavily on human expertise to appropriately discern the downhole state of the liner hanger system based on subtle patterns observed through a series of data streams at the surface (e.g., as rendered to a display, printed to paper, etc.). As explained, a framework may provide for monitoring and/or control of liner hanger tasks where such a framework may include one or more ML models, which may provide, for example, for automatic liner hanger job pattern recognition (e.g., event detection, etc.). As explained, an ML model may be a classification model, noting that various types of machine learning tasks may be accomplished using classification and/or regression. As such, a framework may include one or more ML models for classification and/or regression.

As explained, a liner hanger job refers to a series of activities conducted for a liner hanger installation. Below, examples of ten actions are described:

1. Run in hole: The liner string composed of a liner shoe, float devices, liner joints, and a liner hanger system made up of a liner hanger, liner top packer and a tieback receptacle is conveyed to a desired setting depth using drillpipe and a running tool (e.g., collectively known as the running string). Once at setting depth, an engineer records operational parameters including pick-up weight, slack off weights, and circulation pressures.
2. Drop setting ball: A small ball is released in the bore (e.g., inner diameter or ID) of the drillpipe and allowed to travel down to a ball seat in the running string.
3. Ball land on seat and hold set pressure: Once the ball arrives at the ball seat, the running string ID will be plugged, and internal pressure may be built up. The pressure is increased until the hanger setting pressure is reached.
4. Liner hanger confirmed set: Hydraulically actuated slips of the liner hanger are deployed; noting that one or more types of actuating mechanisms may be utilized. While holding pressure, the string is moved downward to engage the slips with the previous casing and hang the entire weight of the liner string.
5. Increase pressure to release running tool: For hydraulic running tools, the internal pressure is increased to activate a release of the running tool.
6. Right hand turns to release running tool: For mechanical running tools, the running string is rotated to the right to disengage from the liner string after a predetermined number of turns.
7. Confirm running tool release: The running string is picked up a relatively small distance to confirm separation of running string from liner string.
8. Shear ball seat: Internal pressure is increased until the ball seat that retains the drop ball is sheared out thereby allowing circulation of cement to commence.
9. Pick up to expose RDA: The block height, hook load increase and then the hook load steadies; but block height increases.
10. Set packer: The block height decreases and hook load decreases with two short steadies then drops indicating the two shears.

As an example, each activity (e.g., action) may be characterized by the event patterns identifiable from time-series surface data; noting that one or more other types of data may be utilized. Surface data may include, for example, four channels: hook load (HKLD), standpipe pressure (SPP), block height or block position (BPOS), and revolutions per minute (RPM). For example, HKLD may be a measure of the total combined load of the block, running string and liner string; SPP may be a measure of the total pressure loss throughout the system due to fluid friction; BPOS may be a measure of the vertical position of the block; and RPM may be a measure of how fast the uppermost portion of the running string is spinning.

Figure 5:
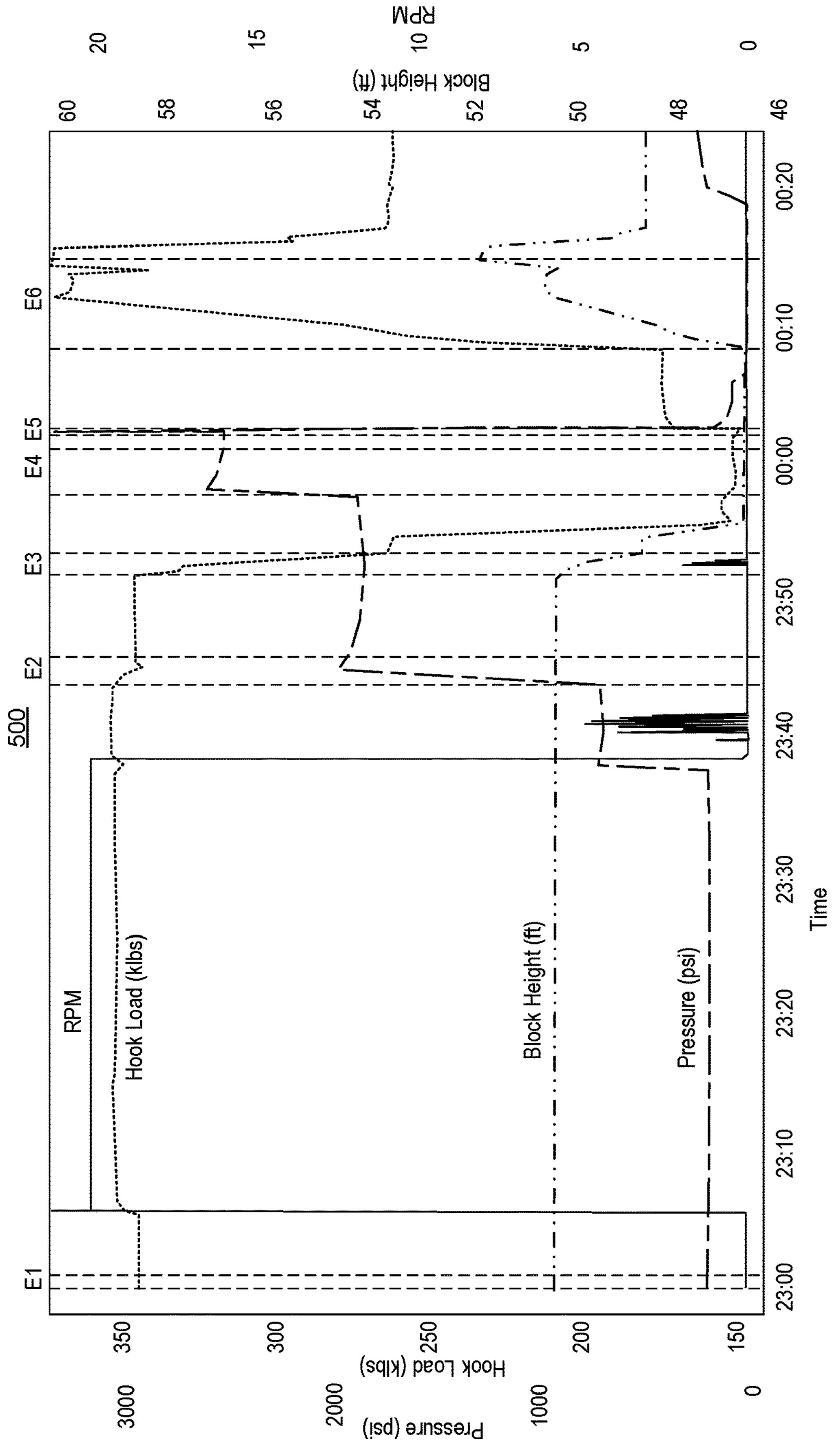
FIG. 5 illustrates an example of a graphical user interface.

FIG. 5 shows an example of a graphical user interface (GUI) 500 that includes time-series data that includes surface data for HKLD, SPP, BPOS and RPM. As shown in the GUI 500, surface data may indicate various patterns, which, as explained, may be a basis for pattern recognition, for example, as to one or more events (see, e.g., events labeled E1, E2, E3, E4, E5 and E6 in the GUI 500). Table 1, below, describes some examples of patterns for various examples of events.

TABLE 1

Examples of patterns (e.g., event patterns).

| | |
|---|---|
| Run in hole | Increasing overall hook load, block height consistently changing. Final slack off and pick up weights (with or without RPMs) are recorded |
| Drop setting ball | All pressure drops off, no rotation, block height steady, and hook load constant |
| Ball land on seat and hold set pressure | Increase in pressure that is then held constant |
| Liner hanger confirmed set | Block height decreases, hook load decreases then steadies |
| Increase pressure to release running tool | Pressure will increase and hold steady at the higher value |
| Right hand turns to release running tool | RPM spikes (3-4 occurrences) |
| Shear ball seat | Pressure will increase and sharply fall off |
| Confirm running tool release | Block height, hook load increase together initially; then hook load levels off and block height continues to increase |

As an example, a liner hanger job may involve performing various activities where some activities may or may not occur. Further, as an example, various activities may be performed in one or more orders (e.g., different orders). Yet further, one or more activities may be performed in parallel.

As explained, a framework may provide for real-time liner hanger job monitoring and/or control using surface data as input, where the framework provides an interpretation of events as output, for example, at a predefined frequency. In such an example, output may provide for triggering one or more control actions. As an example, a framework may include a surface data ingestion component, a real-time surface data and event visualization panel generation component, one or more trigger action and/or trigger graphical control (e.g., buttons, etc.) generation components, and an artificial intelligence (AI) engine (e.g., ML model engine).

As an example, a surface data ingestion component may provide for acquiring real-time data from a rig. It may resample surface data, remove missing values, and pass preprocessed data to a visualization panel component and an AI engine component.

A surface data visualization panel component may show surface data acquired from the rig in real-time. At the same time, once an event is detected, a reminder may be rendered to the visualization panel. The reminder could be designed in various formats. For example, alerts popping up in the panel when an event starts and ends.

As to one or more trigger buttons, these may be used when field engineers finish preparation before a liner hanger job. Once the button is triggered, the AI engine may start to run. A framework may provide for rendering event alerts on to a visualization panel. As an example, after a liner hanger job is completed, a button may be untriggered and the AI engine halted.

As an example, one or more trigger buttons may be job-based or event-based. Job-based trigger means a trigger controlling the detection of multiple events, while event-based trigger means a trigger controlling the detection of single specific event.

As explained, an AI engine may ingest a particular specific set of surface data channels for each event. Below, Table 2 shows some examples of input surface data channels of an AI engine for various examples of events.

TABLE 2

| Example events and input data. | |
|---|---|
| Event | Input Surface Data |
| Ball land on seat and hold set pressure | Block Height, Hook Load, Pressure, RPM |
| Liner hanger confirmed set | Block Height, Hook Load, Pressure, RPM |
| Increase pressure to release running tool | Pressure |
| Right hand turns to release running tool | RPM |
| Shear ball seat | Pressure |
| Confirm running tool release | Block Height, Hook Load |
| Pick up to expose RDA | Block Height, Hook load, Pressure, RPM |
| Set packer | Block Height, Hook Load |

As an example, a framework may provide for extraction of additional information that may be added to surface data to formulate suitable input to an AI engine, which may include one or more ML models such as, for example, an ML model for each event to be detected, etc. As an example, first and second derivatives of each channel and/or a ratio of particular channels may be computed as part of feature engineering to generate features based on data, which may be computed for real time data and input to one or more ML models. As an example, particular channels may be shifted by a certain amount of duration to capture an appropriate amount of information. In various instances, an approach to machine learning may include feature engineering. As explained, features may be generated, which may be specific to particular events as may be inferred using a trained ML model. As explained, feature generation may include computing the ratio of particular channels, shifting particular channels by a customized amount of time to provide a model with more information or more suitable information from which an inference may be generated by an ML model.

As an example, an AI engine may be modeled as follows:

$$(S_{t-l}, S_{t-l+1}, \ldots, S_t) \rightarrow (E_{t-k}, E_{t-k+1}, \ldots, E_{t-r}) \rightarrow E_{t-r},$$

where $S_t$ is the surface data at a given time t, l is the parameter of a sliding window mechanism. A window may be defined as the length of historical surface data to be analyzed when making an inference. $E_t$ is the interpretation of events (e.g., ball land on seat and hold set pressure, set packer, etc.) at the given time t. As to r, it is the parameter of delay mechanism, which may refer to the delay between the given time and the time on which the engine is making an inference. As to the parameter k, it is the parameter of an aggregation mechanism and refers to a length of inference to be made on historical surface data.

As an example, the sliding window mechanism may allow the engine to make an inference based on the pattern of a specific time and based on the pattern of a time range, which may help to ensure accuracy of the engine.

The delay mechanism may allow the engine to give an inference only after a full/deterministic event pattern is fed to the engine. That is why for the given time t, the engine is able to give the inference on the time t−r. In this way, a compromise is made between the accuracy and the timeliness.

As an example, an aggregation mechanism may allow the AI engine to give a series as an intermediate output. Multiple inferences may be generated at each time. Results aggregation may be implemented in a post processing action to generate a final inference. For example, consider use of average, median, mode, etc., as an aggregation method(s). Such a mechanism may help to ensure results given by the engine are smooth. As an example, a method may directly output one data point for each time. As an example, a method may provide for selecting one or more techniques for implementation where, for example, output may be direct or may be via an intermediate output, for example, followed by a single output.

As an example, an AI engine may be built using one or more of various techniques. For example, consider rule-based knowledge systems, machine learning algorithms and/or deep learning neural networks. As an example, a framework may operate where it is possible that for the detection of different events, different techniques are used, and one or more different sliding window mechanism parameters l and/or delay mechanism parameters are applied.

Figure 6:
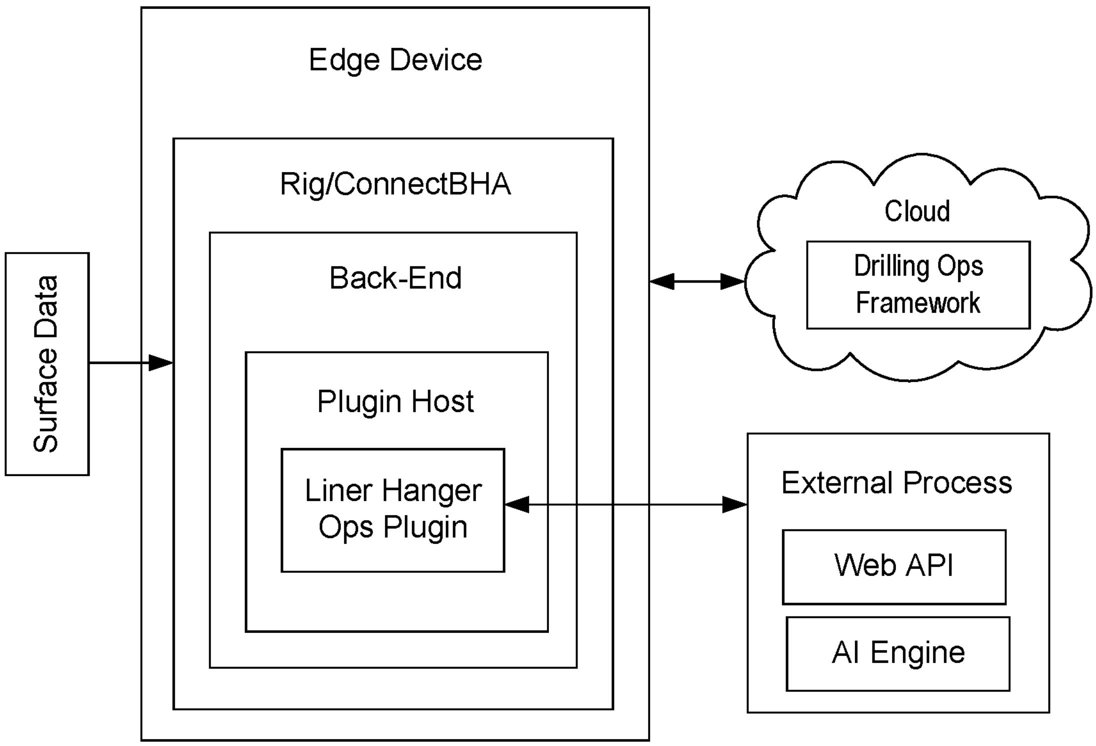
FIG. 6 illustrates examples of components.

FIG. 6 shows an example of various components 600 where, for example, a framework may be implemented as a web type of application. As shown in FIG. 6, an application may consume real-time data coming from a CONNECTBHA framework (SLB, Houston, Texas), which is connected to the rig (e.g., or a drilling operations framework server such as, for example, a DRILLOPS framework server (SLB, Houston, Texas), etc.).

The CONNECTBHA framework may coordinate data acquisition from multiple sources, such as downhole sources as may be associated with downhole equipment (e.g., a bottom hole assembly (BHA), etc.). Such a framework may provide for automated routing of real-time data, for example, to various destinations, which may facilitate various levels of automated monitoring and/or control.

The DRILLOPS framework may execute a digital drilling plan and ensures plan adherence, while delivering goal-based automation. The DRILLOPS framework may generate activity plans automatically for individual operations, whether they are monitored and/or controlled on the rig or in town. Automation may utilize data analysis and learning systems to assist and optimize tasks, such as, for example, setting ROP to drilling a stand. A preset menu of automatable drilling tasks may be rendered, and, using data analysis and models, a plan may be executed in a manner to achieve a specified goal, where, for example, measurements may be utilized for calibration. The DRILLOPS framework provides flexibility to modify and replan activities dynamically, for example, based on a live appraisal of various factors (e.g., equipment, personnel, and supplies). Well construction activities (e.g., tripping, drilling, cementing, etc.) may be continually monitored and dynamically updated using feedback from operational activities. The DRILLOPS framework may provide for various levels of automation based on planning and/or re-planning (e.g., via the DRILLPLAN framework), feedback, etc.

In the example of FIG. 6, the components 600 are arranged to illustrate a workflow that may be performed using various types of hardware, which may include one or more edge devices (e.g., consider one or more end devices, one or more gateway devices (e.g., gateways), etc.). As explained, the CONNECTBHA framework may be implemented where, for example, preprocessing may be performed using a liner hanger operations plugin (e.g., liner hanger ops plugin). As shown, the components 600 include an AI engine that may consume the preprocessed data and that can, for example, send an inference back to the CONNECTBHA framework. As an example, the AI engine may provide for implementation of one or more ML techniques, which may be for ML model building (e.g., training and/or testing), ML model utilization, etc. As an example, one or more of the external processes may be implemented using a cloud platform (e.g., using cloud-based resources, etc.). As an example, an ML model may be generated (e.g., built, etc.) as a relatively lightweight model that may be suitable for implementation using an edge device, which may be a standalone type of edge device or an edge device integrated into one or more pieces of equipment (e.g., an embedded edge device, etc.).

In FIG. 6, one or more of the components 600 may provide for preprocessing, which may include missing value removal, interpolation and time-series smoothing. The front-end of the application (e.g., the CONNECTBHA framework) may serve for visualization panel generation. While the example of FIG. 6 shows surface data as being received by the edge device, one or more other types of data may be received and utilized. For example, in various instances, downhole data may be available from one or more devices that are disposed at least in part in a subsurface environment (e.g., a wellbore, etc.).

Figure 7:
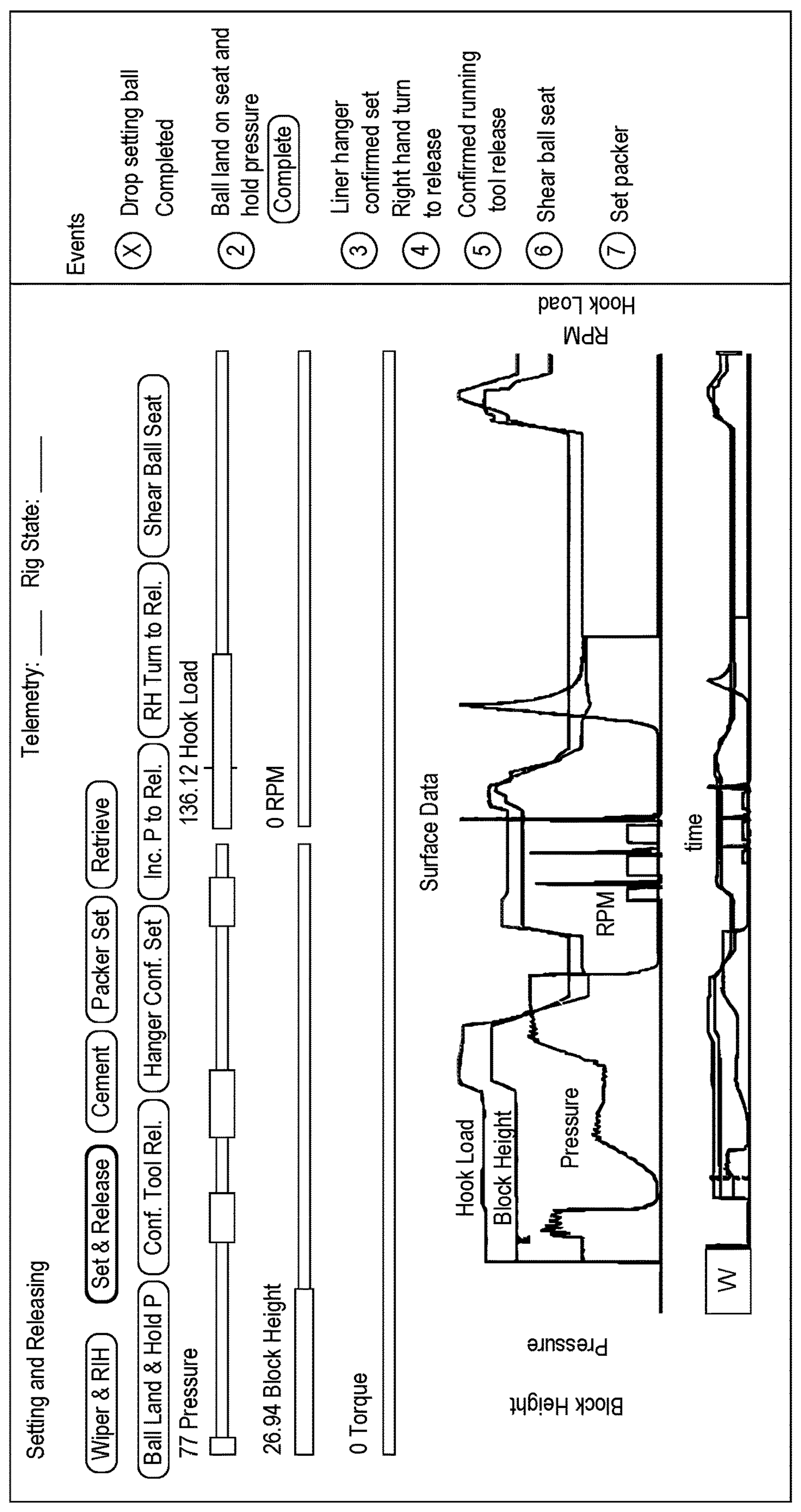
FIG. 7 illustrates an example of a graphical user interface.

FIG. 7 shows an example of a graphical user interface (GUI) 700, which may be rendered, for example, as a web page, with one or more indicators as to whether an event is happening or not. As an example, the GUI 700 may be rendered using a framework that provides for generation and transmission of code for local execution by a computing device that includes a display or that is operatively coupled to a display (e.g., consider one or more types of graphics hardware, etc.) and/or the GUI 700 may be rendered via transmission of images (e.g., bitmap images, etc.) by a framework. As an example, the GUI 700 may be generated at least in part using one or more of the components 600 of FIG. 6. As an example, the edge device of FIG. 6 may include a display, be operatively coupled to a display, and/or provide for rendering to a mobile or other display device; noting that one or more GUIs may be rendered locally and/or remotely.

As shown in the example of FIG. 7, a job-based trigger button may be located on a web page (see, e.g., a graphical control with the text "complete" in the GUI 700). When one or more field engineers are ready to begin a liner hanger job, one or more of them may actuate such a button. In various instances, when the job is completed, the button may be actuated again. As explained, a framework may be integrated into an automation system and/or other controller, where, for example, an inference may provide for generation of a control signal to control one or more pieces of field equipment as may be associated with a field liner hanger job.

As shown, the example GUI 700 may include various graphics for a workflow that includes various events. For example, an event panel of the GUI 700 may list a series of events that are to occur in a sequence. In such an example, the events may include events that correspond to a selected graphical control such as, for example, the setting and releasing graphical control. As shown, the events may include a drop setting ball event, a ball land on seat and hold pressure event, a liner hanger confirmed set event, a right hand (RH) turn to release event, a confirmed running tool release event, a shear ball seat event, and a set packer event. In the example of FIG. 7, the GUI 700 indicates that the drop setting ball event has been completed and that field operations are currently being performed for the ball land on seat and hold pressure event, for which a graphical control may be rendered for activation, whether activation occurs manually via interaction with the GUI 700 or automatically via one or more controllers. As an example, a graphical control may be a type of control graphic that may be interactive via interactions with a human input device, a machine, etc.

In the example of FIG. 7, the GUI 700 includes various graphics for pressure, hook load, block height, RPM and torque, along with one or more panels for plots of variable with respect to time, which may be surface data variables (e.g., block height, pressure, RPM, hook load, etc.).

In the example of FIG. 7, the GUI 700 may include one or more types of graphics, which may include numerical values as to current data values. For example, the pressure (e.g., standpipe pressure) may be currently 77 psi, the hook load may be currently 136.12 klbf, etc. As shown in the pressure graphic, various blocks or limits may be rendered, which may correspond to one or more events, for example, consider pressure values (e.g., pressure limits) as may be expected for one or more of the events. As an example, the various blocks may be colored coded in association with the events such that events and limits (e.g., thresholds, etc.) may be readily observed in relationship to a current pressure value. In such an approach, if a pressure is within its limits for a particular event, a bar may be rendered and observed as to whether it is within the limits.

As explained, a plot may be utilized for rendering of historical values, along with current values. As to event detection (e.g., identification), a framework may provide for generating an event notification within a minute or less during field operations. For example, consider a framework that may generate and issue an event notification in approximately 20 seconds or less such that a sequence of events is not delayed by excessive computing time, etc., and such that the sequence may progress with improved confidence of events occurring and with reduced risk, particularly when compared to human observation of data channel plots alone.

In the example GUI 700, the various graphic controls organized horizontally may be for filtering information with respect to an event or events. For example, the GUI 700 may be focused on the liner hanger confirmed set event, various graphics would be rendered with information relevant to that event, noting that each event may be associated with its own trained ML model for detection of that event. In such an example, block height and hook load channels may be relevant to the liner hanger confirmed set event.

As to the plot panel of the GUI 700, a lower plot may provide for rendering available data for a period of time where a window (W) may be utilized to select a portion of the period of time for rendering as a larger plot. As an example, a plot rendered in the GUI 700 may include one or more labels that correspond to one or more detected events by one or more ML models. For example, in the plot of the GUI 700, various RPM values are shown in approximately three groups, which may correspond to a right hand turn release event.

As explained, a framework may be operable for performance of various field operations, which may include liner hanger related operations. As an example, such a framework may receive data from one or more sensors as may be associated with a rig, which may be in one of a number of rig states where such data may be received via one or more telemetry systems (see, e.g., the GUI 700 and the rig state and telemetry graphics). As an example, data may be received from one or more surface sensors and/or one or more downhole sensors (e.g., consider downhole equipment that may include one or more sensors, etc.). As an example, one or more downhole sensors may provide information as to status of one or more downhole tools, for example, consider tool state information, tool position information, tool stress information, tool mobility information, etc.

As an example, a framework may provide for issuing one or more signals to actuate one or more downhole tools. For example, consider a framework that may issue a signal for actuation of an anchoring mechanism (e.g., a liner hanger anchoring mechanism, etc.). In such an example, a tool may be run in hole (RIH) to a particular position where, once at that position, slips may be engaged responsive to a signal to anchor the tool at that position (e.g., consider a setting operation of a tool with respect to a casing, etc.). In such an example, once the tool is secured via the slips, its transportation string, as utilized to position the tool, may be released from the secured tool. For example, consider a separation mechanism that may be actuated to cause the transportation string to separate from the secured tool. As another example, consider a downhole tool that may be actuated to create a seal to form a chamber downhole, which may isolate a portion of recently poured cement. In such an example, the downhole tool may be or include one or more packers (e.g., consider a liner top packer, etc.). For example, consider a packer that may be utilized to form a barrier with respect to cement.

As shown in the example of FIG. 7, the GUI 700 may include various graphical controls for workflows (e.g., jobs, etc.), such as, for example, wiper trip and run in hole (RIH), cementing, packer setting, retrieving, etc. As an example, the GUI 700 may provide for rendering metrics, such as, for example, maximum overpull, maximum circulation, last pick-up weight, last slack off weight, running string weight value, maximum pick-up distance, friction factor, etc.

As an example, the GUI 700 may be integrated into a framework and/or an environment that may support multiple frameworks, such as, for example, the DELFI environment (SLB, Houston, Texas). The DELFI environment may provide for integration of various frameworks, which may be operated cooperatively, for various tasks, such as, for example, planning wells, constructing wells, developing fields, optimizing production, etc. As an example, the GUI 700 may provide for integration with a planning framework (e.g., the DRILLPLAN framework, SLB, Houston, Texas). For example, depending on an outcome of a liner hanger job (e.g., successfully completed, etc.), a workflow may link to a planning framework to further plan one or more field operations (e.g., completions, etc.). As an example, timings, sequences, events, etc., that may be associated with a liner hanger job of a well may be utilized by a planning framework for that well and/or for one or more other wells.

As an example, the GUI 700 may be part of a framework for real time liner hanger job monitoring and/or control. In such an example, the framework may provide a liner hanger engineer present on the rig with increased insight into the downhole state of a liner hanger system in real time, which may support the liner hanger engineer as to improved judgment confidence level during a liner hanger installation process that may minimize time wasted on troubleshooting and/or misruns that may be caused by misinterpretation of surface signals for each operational step (e.g., each event, etc.). As explained, a controller may be utilized where a GUI may include one or more graphical controls for interactions that may halt, progress, modify, etc., a sequence of events.

As explained, a framework may provide for indications of one or more types of events for field operations. Such a framework may improve field operations, particularly when compared to human observation of one or more data channels for a human to decide whether an event has occurred or not. In various instances, failure to properly determine whether an event has occurred or not may be quite problematic. For example, when cement is in a hole, it may accelerate reactions as the cement may control timings of events due to a time at which the cement reaches a particular hardness (e.g., an inability to flow). In such an example, if components are not separated (e.g., one released from another) prior to pumping and hardening of the cement, a component may effectively become stuck such that another tool must be transported downhole to cut that component out followed by fishing out whatever may be below the cut. Hence, knowing whether or not a tool has been released prior to pumping and hardening of cement may result in fewer failures, where a failure may involve substantial non-productive time (NPT) and/or risks, which may include a well failure risk such that a portion of a well or an entire well must be abandoned (e.g., a catastrophic failure). For example, if a stuck component, resulting from improper notice of release thereof, cannot be cut out, the well may be lost.

As an example, a tool may be deployed that includes one or more types of circuitry, whether utilizing one or more of electrical, mechanical, hydraulic, etc., features, where such a tool may provide for actuating its own mechanism and/or for actuating one or more other mechanisms of one or more other tools. In such an example, a framework may provide for programming the tool and/or one or more of the other tools such that some level of downhole control may be implemented. In such an example, the framework may provide for confirming, triggering, etc., one or more downhole activities, positions, statuses, etc. As an example, a framework may be part of a network that includes one or more tools that may include circuitry that may form part of the network. As an example, one or more tools may include circuitry that may be suitable for execution of one or more ML models. For example, consider a tool that includes a processor and memory along with instructions to execute an ML model downhole, which may utilize one or more types of data (e.g., sensor data, etc.) as input to generate output, which may be a control signal.

As an example, one or more ML models may provide for receipt of one or more tool characteristics. For example, different tools or tool models may have different characteristics. As an example, one or more ML models may be trained using data associated with one or more tools, which may be tools of common specifications or tools of different specifications.

As an example, one or more events for field operations may be identifiable using one or more types of ML models. As an example, a framework may employ a number of ML models where, for example, each event in a sequence of field operations may be identifiable using a particular trained ML model. As explained, surface data and/or other data may be utilized where some data may be indicative of one type of event and other data may be indicative of another type of event. In such an approach, an ML model may be selected and trained for identification (e.g., detection, etc.) of a particular event in a sequence of events for field operations.

Figure 8:
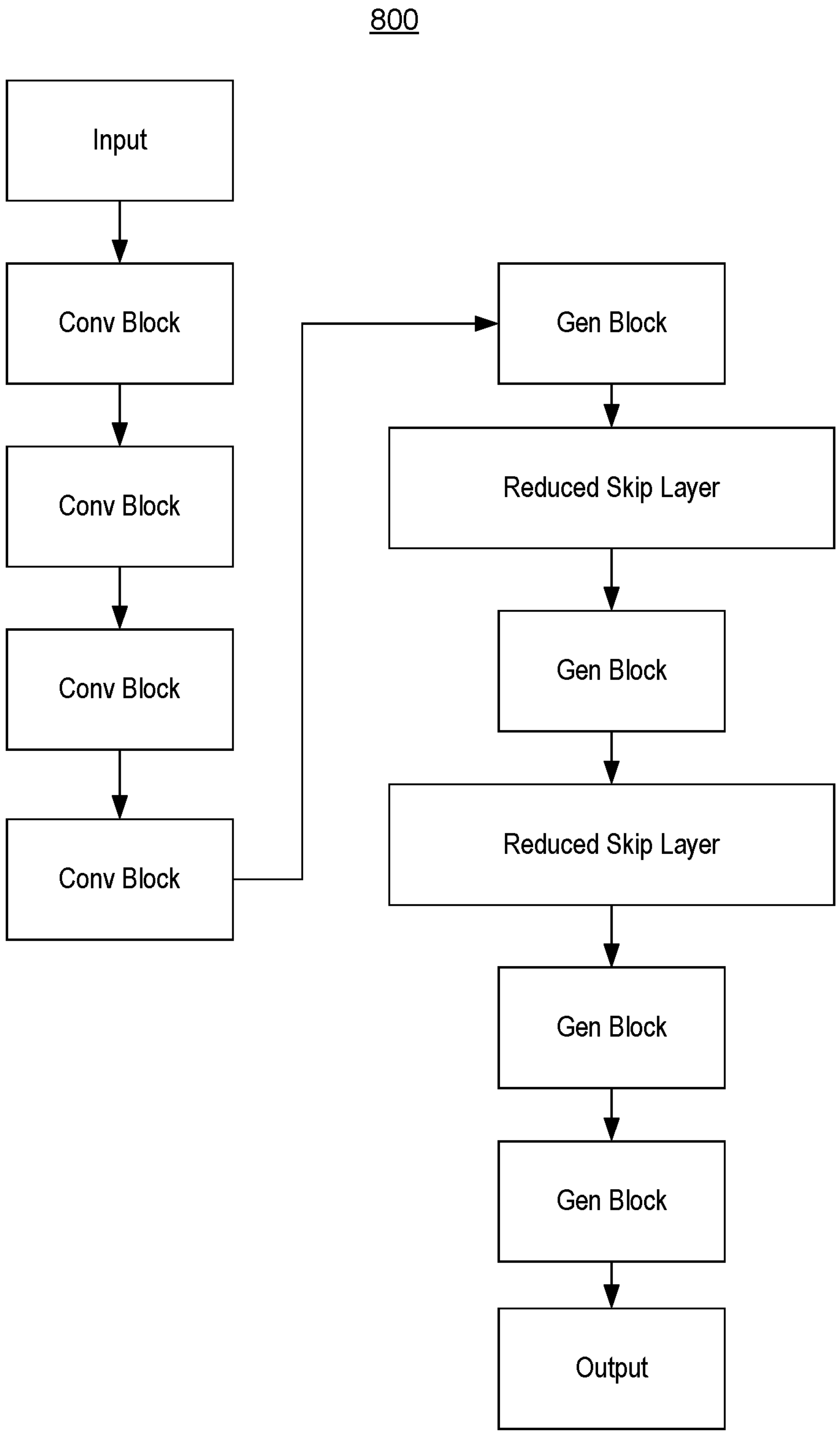
FIG. 8 illustrates an example of a machine learning model.

FIG. 8 shows an example of an ML model architecture 800. In the example of FIG. 8, the architecture 800 corresponds to a U-Net based model.

Figure 9:
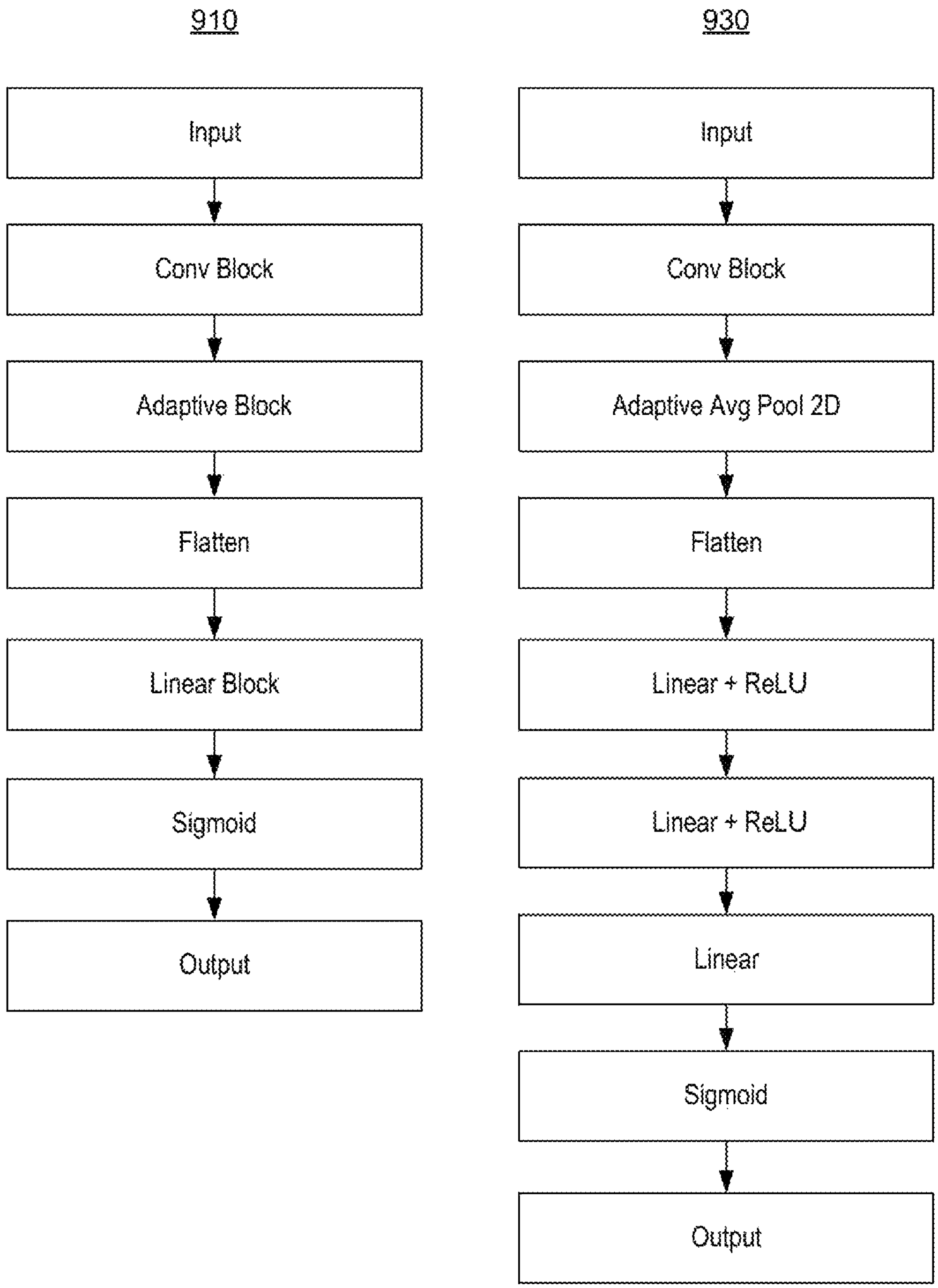
FIG. 9 illustrates examples of machine learning models.

FIG. 9 shows examples of ML model architectures 910 and 930. In the example of FIG. 9, the architectures 910 and 930 may correspond to vanilla based ML models (e.g., a vanilla CNN based model, etc.). In the example of FIG. 9, the architecture 910 may be considered to be more general where the architecture 930 may be a variant of the architecture 910. As an example, an adaptive block may utilize one or more techniques. For example, consider utilizing one or more of an adaptive max pool layer and an adaptive avg pool layer. As shown, a linear block may utilize one or more rectified linear units (ReLUs) and/or multiple linear blocks (e.g., or layers) may be included (e.g., with and/or without an ReLU, etc.).

In various trials, an AI engine was built using deep learning neural networks. As explained, a CNN and a CNN variation U-Net based model may be applied for detection of different events. Table 3 shows the settings for detecting each event. In particular, Table 3, below, shows some examples of ML models and their performance for various liner hanger related tasks as to generation of inference outputs using surface data.

TABLE 3

Examples of events and ML models.

| | Architecture | r | Aggregation | Accuracy |
|---|---|---|---|---|
| Ball land on seat and hold set pressure | CNN | 5 | 1 | 97.63% |
| Liner hanger confirmed set | U-Net based CNN | 5 | 1 | 91.88% |
| Increase pressure to release running tool | U-Net based CNN | 5 | 1 | 70.36% |
| Right hand turns to release running tool | CNN | 0 | 1 | 95.45% |
| Shear ball seat | U-Net based CNN | 0 | 1 | 91.34% |
| Confirm running tool release | U-Net based CNN | 5 | 1 | 92.05% |
| Pick up to expose RDA | CNN | 5 | 1 | 96.86% |
| Set packer | U-Net based CNN | 5 | 1 | 86.72% |
| Average | N/A | 3.75 | 1 | 90.29% |

In various trials, neural network models were trained with 60 jobs acquired from field and tested on 3 jobs. Intersection over union (IoU) is used as a metric to evaluate their accuracy. The average IoU reaches 90.29% with 5 seconds of delay (e.g., near real-time or real-time performance). Based on a subjective evaluation by domain experts, these results are acceptable for a framework that may provide for monitoring and/or control of various field operations (e.g., actions, activities, etc., as associated with field equipment).

In various trials, an AI engine was built using deep learning neural networks. As explained, a CNN and a CNN variation U-Net based model may be applied for detection of different events. In such an approach, the CNN variation U-Net based model may include an architecture that includes one or more features of the U-Net based architecture 800 of FIG. 8 and the CNN may be a vanilla CNN based model (e.g., a vanilla based CNN) that may include an architecture that includes one or more features of the architecture 910 and/or the architecture 930 of FIG. 9. Table 4 shows the settings for detecting various events. In particular, Table 4, below, shows some examples of ML models and their performance for various liner hanger related tasks as to generation of inference outputs using surface data.

TABLE 4

Examples of events and ML models.

| | Architecture | r | Aggregation | Accuracy |
|---|---|---|---|---|
| Ball land on seat and hold set pressure | Vanilla based CNN | 5 | 1 | 73.10% |
| Liner hanger confirmed set | U-Net based CNN | 5 | 1 | 86.29% |
| Increase pressure to release running tool | U-Net based CNN | 5 | 1 | 69.63% |
| Right hand turns to release running tool | Vanilla based CNN | 0 | 1 | 89.20% |
| Shear ball seat | U-Net based CNN | 0 | 1 | 89.15% |
| Confirm running tool release | U-Net based CNN | 5 | 1 | 91.25% |
| Pick up to expose RDA | Vanilla based CNN | 5 | 1 | 80.00% |
| Set packer | U-Net based CNN | 5 | 1 | 77.95% |
| Average | N/A | 3.75 | 1 | 82.07% |

In the examples of Table 4, a common model evaluation technique was applied in an AI domain. In Table 4, the neural network models were trained with 77 collet running tool jobs and 34 right hand release running tool jobs acquired from field and tested on 3 jobs. Intersection over union (IoU) may be used as a metric to evaluate model accuracy. As shown in Table 4, the average IoU reaches 82.07% with 4.30 seconds of delay by unit testing on 29 right hand release running tool jobs. Based on a subjective evaluation by domain experts, these results were deemed to be acceptable.

As shown in Table 4, the event for confirming running tool release provides for an accuracy of approximately 91 percent. As explained, confirmation of a tool release may be beneficial in reducing risk of NPT and/or well loss. Events such as confirmation of a liner hanger being set and/or confirmation of a packer being set may also provide for risk reduction, for example, with respect to NPT and/or well loss.

As an example, a framework may include and/or be operatively coupled to a gateway such as, for example, an AGORA gateway (e.g., consider one or more processors, memory, etc., which may be deployed as a "box" that may be locally powered and that may communicate locally with other equipment via one or more interfaces). As an example, one or more pieces of equipment may include computational resources that may be akin to those of an AGORA gateway or more or less than those of an AGORA gateway. As an example, an AGORA gateway may be a network device.

As an example, a gateway may include one or more features of an AGORA gateway (e.g., v.202, v.402, etc.) and/or another gateway. For example, consider an INTEL ATOM E3930 or E3950 Dual Core with DRAM and an eMMC and/or SSD. Such a gateway may include a trusted platform module (TPM), which may provide for secure and measured boot support (e.g., via hashes, etc.). A gateway may include one or more interfaces (e.g., Ethernet, RS485/422, RS232, etc.). As to power, a gateway may consume less than about 100 W (e.g., consider less than 10 W or less than 20 W). As an example, a gateway may include an operating system (e.g., consider LINUX DEBIAN LTS). As an example, a gateway may include a cellular interface (e.g., 4G LTE with Global Modem/GPS, etc.). As an example, a gateway may include a WIFI interface (e.g., 802.11 a/b/g/n). As an example, a gateway may be operable using AC 100-240 V, 50/60 Hz or 24 VDC. As to dimensions, consider a gateway that has a protective box with dimensions of approximately 10 in×8 in×4 in.

Figure 10:
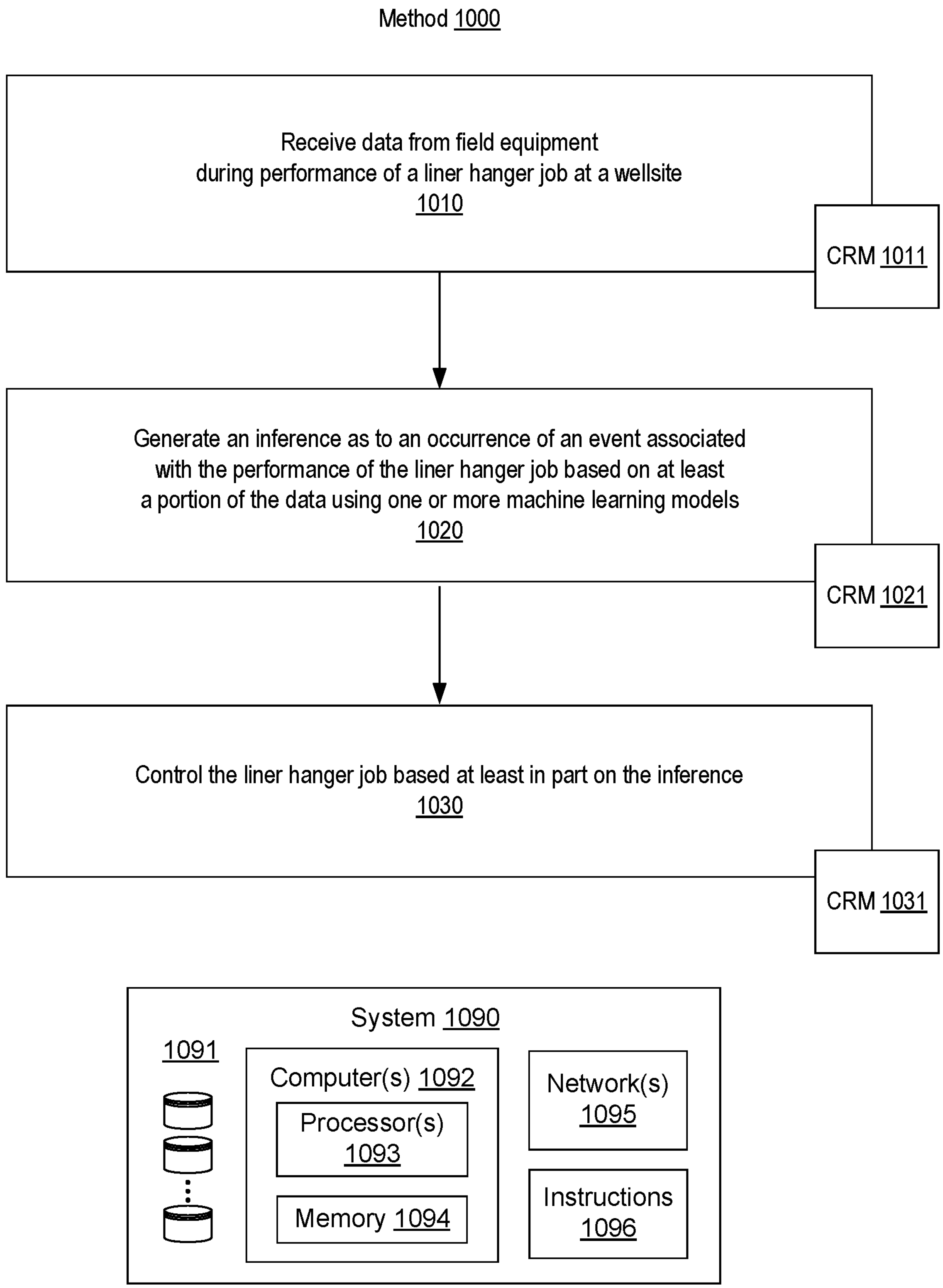
FIG. 10 illustrates an example of a method and an example of a system.

FIG. 10 shows an example of a method 1000 and an example of a system 1090. As shown, the method 1000 may include a reception block 1010 for receiving data from field equipment during performance of a liner hanger job at a wellsite; a generation block 1020 for generating an inference as to an occurrence of an event associated with the performance of the liner hanger job based on at least a portion of the data using one or more machine learning models; and a control block 1030 for controlling the performance of the liner hanger job based at least in part on the inference.

The method 1000 is shown in FIG. 10 in association with various computer-readable media (CRM) blocks 1011, 1021 and 1031. Such blocks generally include instructions suitable for execution by one or more processors (or processor cores) to instruct a computing device or system to perform one or more actions. While various blocks are shown, a single medium may be configured with instructions to allow for, at least in part, performance of various actions of the method 1000. As an example, a computer-readable medium (CRM) may be a computer-readable storage medium that is non-transitory and that is not a carrier wave. As an example, one or more of the blocks 1011, 1021 and 1031 may be in the form processor-executable instructions.

In the example of FIG. 10, the system 1090 includes one or more information storage devices 1091, one or more computers 1092, one or more networks 1095 and instructions 1096. As to the one or more computers 1092, each computer may include one or more processors (e.g., or processing cores) 1093 and memory 1094 for storing the instructions 1096, for example, executable by at least one of the one or more processors 1093 (see, e.g., the blocks 1011, 1021 and 1031). As an example, a computer may include one or more network interfaces (e.g., wired or wireless), one or more graphics cards, a display interface (e.g., wired or wireless), etc.

As to types of machine learning models, consider one or more of a support vector machine (SVM) model, a k-nearest neighbors (KNN) model, an ensemble classifier model, a neural network (NN) model, etc. As an example, a machine learning model may be a deep learning model (e.g., deep Boltzmann machine, deep belief network, convolutional neural network, stacked auto-encoder, etc.), an ensemble model (e.g., random forest, gradient boosting machine, bootstrapped aggregation, AdaBoost, stacked generalization, gradient boosted regression tree, etc.), a neural network model (e.g., radial basis function network, perceptron, back-propagation, Hopfield network, etc.), a regularization model (e.g., ridge regression, least absolute shrinkage and selection operator, elastic net, least angle regression), a rule system model (e.g., cubist, one rule, zero rule, repeated incremental pruning to produce error reduction), a regression model (e.g., linear regression, ordinary least squares regression, stepwise regression, multivariate adaptive regression splines, locally estimated scatterplot smoothing, logistic regression, etc.), a Bayesian model (e.g., naïve Bayes, average on-dependence estimators, Bayesian belief network, Gaussian naïve Bayes, multinomial naïve Bayes, Bayesian network), a decision tree model (e.g., classification and regression tree, iterative dichotomiser 3, C4.5, C5.0, chi-squared automatic interaction detection, decision stump, conditional decision tree, M5), a dimensionality reduction model (e.g., principal component analysis, partial least squares regression, Sammon mapping, multidimensional scaling, projection pursuit, principal component regression, partial least squares discriminant analysis, mixture discriminant analysis, quadratic discriminant analysis, regularized discriminant analysis, flexible discriminant analysis, linear discriminant analysis, etc.), an instance model (e.g., k-nearest neighbor, learning vector quantization, self-organizing map, locally weighted learning, etc.), a clustering model (e.g., k-means, k-medians, expectation maximization, hierarchical clustering, etc.), etc.

As an example, a machine model, which may be a machine learning model (ML model), may be built using a computational framework with a library, a toolbox, etc., such as, for example, those of the MATLAB framework (MathWorks, Inc., Natick, Massachusetts). The MATLAB framework includes a toolbox that provides supervised and unsupervised machine learning algorithms, including support vector machines (SVMs), boosted and bagged decision trees, k-nearest neighbor (KNN), k-means, k-medoids, hierarchical clustering, Gaussian mixture models, and hidden Markov models. Another MATLAB framework toolbox is the Deep Learning Toolbox (DLT), which provides a framework for designing and implementing deep neural networks with algorithms, pretrained models, and apps. The DLT provides convolutional neural networks (ConvNets, CNNs) and long short-term memory (LSTM) networks to perform classification and regression on image, time-series, and text data. The DLT includes features to build network architectures such as generative adversarial networks (GANs) and Siamese networks using custom training loops, shared weights, and automatic differentiation. The DLT provides for model exchange various other frameworks.

As an example, the TENSORFLOW framework (Google LLC, Mountain View, CA) may be implemented, which is an open-source software library for dataflow programming that includes a symbolic math library, which may be implemented for machine learning applications that may include neural networks. As an example, the CAFFE framework may be implemented, which is a DL framework developed by Berkeley AI Research (BAIR) (University of California, Berkeley, California). As another example, consider the SCIKIT platform (e.g., scikit-learn), which utilizes the PYTHON programming language. As an example, a framework such as the APOLLO AI framework may be utilized (APOLLO.AI GmbH, Germany). As an example, a framework such as the PYTORCH framework may be utilized (Facebook AI Research Lab (FAIR), Facebook, Inc., Menlo Park, California).

As an example, a training method may include various actions that may operate on a dataset to train an ML model. As an example, a dataset may be split into training data and test data where test data may provide for evaluation. A method may include cross-validation of parameters and best parameters, which may be provided for model training.

The TENSORFLOW framework may run on multiple CPUs and GPUs (with optional CUDA (NVIDIA Corp., Santa Clara, California) and SYCL (The Khronos Group Inc., Beaverton, Oregon) extensions for general-purpose computing on graphics processing units (GPUs)). TENSORFLOW is available on 64-bit LINUX, MACOS (Apple Inc., Cupertino, California), WINDOWS (Microsoft Corp., Redmond, Washington), and mobile computing platforms including ANDROID (Google LLC, Mountain View, California) and IOS (Apple Inc.) operating system based platforms.

TENSORFLOW computations may be expressed as stateful dataflow graphs; noting that the name TENSORFLOW derives from the operations that such neural networks perform on multidimensional data arrays. Such arrays may be referred to as "tensors".

As an example, a device may utilize TENSORFLOW LITE (TFL) or another type of lightweight framework. For example, consider a gateway that may be in the field (e.g., on-site) and that may utilize the TFL and/or one or more other types of lightweight frameworks. The TFL framework is a set of tools that enables on-device machine learning where models may run on mobile, embedded, and IoT devices. The TFL framework is optimized for on-device machine learning, by addressing latency (no round-trip to a server), privacy (no personal data leaves the device), connectivity (Internet connectivity is demanded), size (reduced model and binary size) and power consumption (e.g., efficient inference and a lack of network connections). The TFL framework offers multiple platform support, covering ANDROID and iOS devices, embedded LINUX, and microcontrollers. The TFL framework offers diverse language support includes JAVA, SWIFT, Objective-C, C++, and PYTHON. The TFL framework may provide high performance via hardware acceleration and model optimization.

As an example, a gateway device may be operatively coupled to one or more sensors for receipt of data (e.g., HKLD, SPP, BPOS and RPM) where an AI engine may generate one or more inferences using at least a portion of such data. In such an example, the gateway may include an interface for outputting one or more outputs to one or more display devices, controllers, network devices, etc., where, for example, one or more liner hanger job operations may be controlled based at least in part on such one or more outputs.

As an example, a method may include receiving data from field equipment during performance of a liner hanger job at a wellsite; generating an inference as to an occurrence of an event associated with the performance of the liner hanger job based on at least a portion of the data using one or more machine learning models; and controlling the performance of the liner hanger job based at least in part on the inference. In such an example, the data may be or include surface data generated by surface equipment. For example, consider surface data that include one or more of hook load, standpipe pressure, block position and revolutions per minute. As an example, an event may be an event that corresponds to a release of a running tool disposed at least in part in a wellbore at the wellsite.

As an example, an inference may be based on pattern recognition in at least a portion of received data.

As an example, data may be or include time-series data. As an example, a method may include implementing a sliding window to process the time-series data.

As an example, a method may include implementing a delay mechanism that controls generating of an inference with respect to occurrence of a full event pattern. In such an example, the delay mechanism may provide a compromise between machine learning model timeliness and machine learning model accuracy.

As an example, one or more machine learning models may include a neural network model. As an example, one or more machine learning models may include at least one convolution neural network model (e.g., a CNN model, a U-Net based model, a vanilla CNN based model, etc.).

As an example, a method may include training one or more machine learning models using data from one or more prior liner hanger jobs.

As an example, a method may include controlling via rendering a control graphic (e.g., a graphical control) to a graphical user interface and/or via issuing a control signal.

As an example, a liner hanger job may include different events where one or more machine learning models may be different machine learning models for at least two of the different events.

As an example, a method may include receiving and generating that are performed using a computational framework or computational frameworks.

As an example, a method may include generating an inference that occurs within less than 20 seconds from receipt of at least a portion of data indicative of a full event pattern.

As an example, a liner hanger job may include at least three events. As an example, a liner hanger job may include 8 events, 9 events, 10 events, etc. As an example, one or more events may occur over overlapping periods of time (e.g., at least in part in parallel).

As an example, a system may include one or more processors; memory accessible to at least one of the one or more processors; processor-executable instructions stored in the memory and executable to instruct the system to: receive data from field equipment during performance of a liner hanger job at a wellsite; generate an inference as to an occurrence of an event associated with the performance of the liner hanger job based on at least a portion of the data using one or more machine learning models; and control the performance of the liner hanger job based at least in part on the inference.

As an example, one or more computer-readable storage media may include processor-executable instructions to instruct a computing system to: receive data from field equipment during performance of a liner hanger job at a wellsite; generate an inference as to an occurrence of an event associated with the performance of the liner hanger job based on at least a portion of the data using one or more machine learning models; and control the performance of the liner hanger job based at least in part on the inference.

As an example, a computer program product may include one or more computer-readable storage media that may include processor-executable instructions to instruct a computing system to perform one or more methods and/or one or more portions of a method.

According to an embodiment, one or more computer-readable media may include computer-executable instructions to instruct a computing system to output information for controlling a process. For example, such instructions may provide for output to sensing process, an injection process, drilling process, an extraction process, an extrusion process, a pumping process, a heating process, etc.

Figure 11:
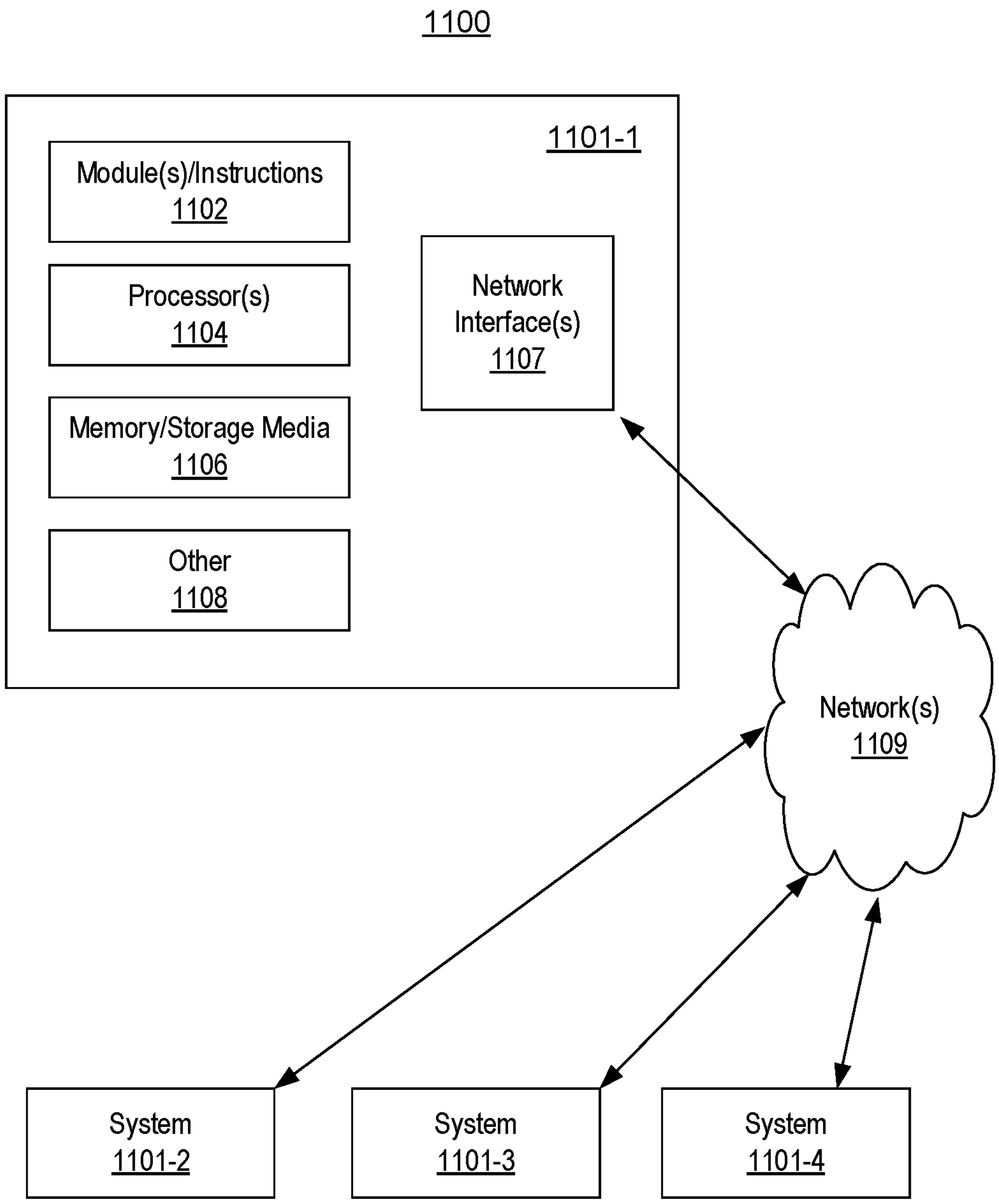
FIG. 11 illustrates an example of a networked computational equipment that may form a networked computational system.

In some embodiments, a method or methods may be executed by a computing system. FIG. 11 shows an example of a system 1100 that may include one or more computing systems 1101-1, 1101-2, 1101-3 and 1101-4, which may be operatively coupled via one or more networks 1109, which may include wired and/or wireless networks.

As an example, a system may include an individual computer system or an arrangement of distributed computer systems. In the example of FIG. 11, the computer system 1101-1 may include one or more modules 1102, which may be or include processor-executable instructions, for example, executable to perform various tasks (e.g., receiving information, requesting information, processing information, simulation, outputting information, etc.).

As an example, a module may be executed independently, or in coordination with, one or more processors 1104, which is (or are) operatively coupled to one or more storage media 1106 (e.g., via wire, wirelessly, etc.). As an example, one or more of the one or more processors 1104 may be operatively coupled to at least one of one or more network interface 1107. In such an example, the computer system 1101-1 may transmit and/or receive information, for example, via the one or more networks 1109 (e.g., consider one or more of the Internet, a private network, a cellular network, a satellite network, etc.). As shown, one or more other components 1108 may be included in the computer system 1101-1.

As an example, the computer system 1101-1 may receive from and/or transmit information to one or more other devices, which may be or include, for example, one or more of the computer systems 1101-2, etc. A device may be located in a physical location that differs from that of the computer system 1101-1. As an example, a location may be, for example, a processing facility location, a data center location (e.g., server farm, etc.), a rig location, a wellsite location, a downhole location, etc.

As an example, a processor may be or include a microprocessor, microcontroller, processor module or subsystem, programmable integrated circuit, programmable gate array, or another control or computing device.

As an example, the storage media 1106 may be implemented as one or more computer-readable or machine-readable storage media. As an example, storage may be distributed within and/or across multiple internal and/or external enclosures of a computing system and/or additional computing systems.

As an example, a storage medium or storage media may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLUERAY disks, or other types of optical storage, or other types of storage devices.

As an example, a storage medium or media may be located in a machine running machine-readable instructions, or located at a remote site from which machine-readable instructions may be downloaded over a network for execution.

As an example, various components of a system such as, for example, a computer system, may be implemented in hardware, software, or a combination of both hardware and software (e.g., including firmware), including one or more signal processing and/or application specific integrated circuits.

As an example, a system may include a processing apparatus that may be or include a general-purpose processors or application specific chips (e.g., or chipsets), such as ASICs, FPGAs, PLDs, or other appropriate devices.

As an example, a device may be a mobile device that includes one or more network interfaces for communication of information. For example, a mobile device may include a wireless network interface (e.g., operable via IEEE 802.11, ETSI GSM, BLUETOOTH, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

As an example, a system may be a distributed environment, for example, a so-called "cloud" environment where various devices, components, etc. interact for purposes of data storage, communications, computing, etc. As an example, a device or a system may include one or more components for communication of information via one or more of the Internet (e.g., where communication occurs via one or more Internet protocols), a cellular network, a satellite network, etc. As an example, a method may be implemented in a distributed environment (e.g., wholly or in part as a cloud-based service).

As an example, information may be input from a display (e.g., consider a touchscreen), output to a display or both. As an example, information may be output to a projector, a laser device, a printer, etc. such that the information may be viewed. As an example, information may be output stereographically or holographically. As to a printer, consider a 2D or a 3D printer. As an example, a 3D printer may include one or more substances that may be output to construct a 3D object. For example, data may be provided to a 3D printer to construct a 3D representation of a subterranean formation. As an example, layers may be constructed in 3D (e.g., horizons, etc.), geobodies constructed in 3D, etc. As an example, holes, fractures, etc., may be constructed in 3D (e.g., as positive structures, as negative structures, etc.).

Although only a few examples have been described in detail above, those skilled in the art will readily appreciate that many modifications are possible in the examples. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A method comprising:

receiving, via a processing system, data from a liner hanger system at least partially disposed within a borehole during a performance of a liner hanger job at a wellsite, wherein the liner hanger system comprises a liner, a liner top packer, a traveling block, a running string, and a lining string, wherein the liner hanger job comprises a series of events for coupling the liner to a casing within the borehole such that the liner extends below the casing within the borehole, and wherein the data comprises a hook load (HKLD) indicating a combined load caused by the traveling block, the running string, and the lining string, a standpipe pressure (SPP) indicating pressure loss in the liner hanger system caused by fluid friction, a block position (BPOS) indicating a vertical position of the traveling block, and a revolutions per minute (RPM) indicating a rotational velocity of a portion of the running string;

generating, via one or more pretrained machine learning models, an inference as to a completion of an event of the series of events associated with the performance of the liner hanger job based on at least a subset of the data, wherein the event comprises:

drop setting a ball within the liner hanger system, the ball landing in a ball seat of the running string and increasing a level of pressure within the liner hanger system, a deployment of one or more hydraulically actuated slips of the liner hanger system, a turn of the running string to disengage the running string from the lining string, a confirmation of the running string being released from the lining string, the ball seat of the running string being sheared from the liner hanger system, or the liner top packer being set within the borehole; and controlling, via the processing system, the performance of the liner hanger job by transmitting one or more downhole signals to the liner hanger system to cause the liner hanger system to perform a subsequent event in the series of events associated with the performance of the liner hanger job based at least in part on the inference indicating the completion of the event.

2. The method of claim 1, wherein the data comprise surface data generated by a hook load sensor, a standpipe pressure sensor, a block position sensor, and a rotational sensor.

3. The method of claim 1, wherein the inference is based on pattern recognition in at least a portion of the data for a number of patterns, wherein each of the number of patterns is associated with a different event in the series of events associated with the performance of the liner hanger job.

4. The method of claim 1, wherein the data comprise time-series data.

5. The method of claim 4, comprising implementing a sliding window to process the time-series data.

6. The method of claim 1, comprising implementing a delay mechanism that controls the generating of the inference with respect to an occurrence of a full event pattern for the event.

7. The method of claim 6, wherein the delay mechanism provides a compromise between machine learning model timeliness and machine learning model accuracy.

8. The method of claim 1, wherein the one or more pretrained machine learning models comprise at least one of a neural network model, a convolution neural network model, or a U-Net based model.

9. The method of claim 1, comprising training the one or more pretrained machine learning models to identify the completion of a particular event in the series of events using additional data from one or more prior liner hanger jobs.

10. The method of claim 1, comprising rendering a control graphic on a graphical user interface, wherein the control graphic comprises an indication of the completion of the event.

11. The method of claim 1, wherein the one or more pretrained machine learning models comprise different machine learning models for at least two different events in the series of events.

12. The method of claim 1, wherein generating the inference occurs within 20 seconds of the processing system receiving at least a portion of the data indicative of a full event pattern for the event.

13. A system comprising:

one or more processors;

memory accessible to at least one of the one or more processors;

processor-executable instructions stored in the memory and executable to instruct the system to:

receive data from a liner hanger system at least partially disposed within a borehole during a performance of a liner hanger job at a wellsite, wherein the liner hanger system comprises a liner, a liner top packer, a traveling block, a running string, and a lining string, wherein the liner hanger job comprises a series of events for coupling the liner to a casing within the borehole such that the liner extends below the casing within the borehole, and wherein the data comprises a hook load (HKLD) indicating a combined load caused by the traveling block, the running string, and the lining string, a standpipe pressure (SPP) indicating pressure loss in the liner hanger system caused by fluid friction, a block position (BPOS) indicating a vertical position of the traveling block, and a revolutions per minute (RPM) indicating a rotational velocity of a portion of the running string;

generate, via one or more pretrained machine learning models, an inference as to a completion of an event of the series of events associated with the performance of the liner hanger job based on at least a subset of the data, wherein the event comprises:

drop setting a ball within the liner hanger system, the ball landing in a ball seat of the running string and increasing a level of pressure within the liner hanger system, a deployment of one or more hydraulically actuated slips of the liner hanger system, a turn of the running string to disengage the running string from the lining string, a confirmation of the running string being released from the lining string, the ball seat of the running string being sheared from the liner hanger system, or the liner top packer being set within the borehole; and control the performance of the liner hanger job by transmitting one or more downhole signals to the liner hanger system to cause the liner hanger system to perform a subsequent event in the series of events associated with the performance of the liner hanger job based at least in part on the inference indicating the completion of the event.

14. One or more non-transitory computer-readable storage media comprising processor-executable instructions to instruct a computing system to:

receive data from a liner hanger system at least partially disposed within a borehole during a performance of a liner hanger job at a wellsite, wherein the liner hanger system comprises a liner, a liner top packer, a traveling block, a running string, and a lining string, wherein the liner hanger job comprises a series of events for coupling the liner to a casing within the borehole such that the liner extends below the casing within the borehole, and wherein the data comprises a hook load (HKLD) indicating a combined load caused by the traveling block, the running string, and the lining string, a standpipe pressure (SPP) indicating pressure loss in the liner hanger system caused by fluid friction, a block position (BPOS) indicating a vertical position of the traveling block, and a revolutions per minute (RPM) indicating a rotational velocity of a portion of the running string;

generate, via one or more pretrained machine learning models, an inference as to a completion of an event of the series of events associated with the performance of the liner hanger job based on at least a subset of the data, wherein the event comprises:

drop setting a ball within the liner hanger system, the ball landing in a ball seat of the running string and increasing a level of pressure within the liner hanger system, a deployment of one or more hydraulically actuated slips of the liner hanger system, a turn of the running string to disengage the running string from the lining string, a confirmation of the running string being released from the lining string, the ball seat of the running string being sheared from the liner hanger system, or the liner top packer being set within the borehole; and control the performance of the liner hanger job by transmitting one or more downhole signals to the liner hanger system to cause the liner hanger system to perform a subsequent event in the series of events associated with the performance of the liner hanger job based at least in part on the inference indicating the completion of the event.

15. The system of claim 13, wherein the processor-executable instructions instruct the system to train the one or more pretrained machine learning models to identify the completion of a particular event in the series of events based on additional data associated with one or more prior liner hanger jobs.

16. The one or more non-transitory computer-readable storage media of claim 14, wherein the processor-executable instructions instruct the computing system to train the one or more pretrained machine learning models to identify the completion of a particular event in the series of events based on additional data associated with one or more prior liner hanger jobs.

17. The method of claim 9, comprising training the one or more pretrained machine learning models for a plurality of liner hanger systems based on different technical specifications associated with the plurality of liner hanger systems.

18. The method of claim 1, wherein the one or more pretrained machine learning models are trained to generate the inference as to the completion of:

drop setting the ball within the liner hanger system based on the subset of the data comprising the block position, the hook load, the standpipe pressure, and the revolutions per minute, the ball landing in the ball seat of the running string and increasing the level of pressure within the liner hanger system based on the subset of the data comprising the block position, the hook load, the standpipe pressure, and the revolutions per minute, the deployment of the one or more hydraulically actuated slips of the liner hanger system based on the subset of the data comprising the block position and the hook load, the turn of the running string to disengage the running string from the lining string based on the subset of the data comprising the revolutions per minute, the confirmation of the running string being released from the lining string based on the subset of the data comprising the block position and the hook load, the ball seat of the running string being sheared from the liner hanger system based on the standpipe pressure, and the liner top packer being set within the borehole based on the subset of the data comprising the block position and the hook load.

19. The system of claim 13, wherein the one or more pretrained machine learning models are trained to generate the inference as to the completion of:

drop setting the ball within the liner hanger system based on the subset of the data comprising the block position, the hook load, the standpipe pressure, and the revolutions per minute, the ball landing in the ball seat of the running string and increasing the level of pressure within the liner hanger system based on the subset of the data comprising the block position, the hook load, the standpipe pressure, and the revolutions per minute, the deployment of the one or more hydraulically actuated slips of the liner hanger system based on the subset of the data comprising the block position and the hook load, the turn of the running string to disengage the running string from the lining string based on the subset of the data comprising the revolutions per minute, the confirmation of the running string being released from the lining string based on the subset of the data comprising the block position and the hook load, the ball seat of the running string being sheared from the liner hanger system based on the standpipe pressure, and the liner top packer being set within the borehole based on the subset of the data comprising the block position and the hook load.

20. The one or more non-transitory computer-readable storage media of claim 14, wherein the one or more pretrained machine learning models are trained to generate the inference as to the completion of:

drop setting the ball within the liner hanger system based on the subset of the data comprising the block position, the hook load, the standpipe pressure, and the revolutions per minute, the ball landing in the ball seat of the running string and increasing the level of pressure within the liner hanger system based on the subset of the data comprising the block position, the hook load, the standpipe pressure, and the revolutions per minute, the deployment of the one or more hydraulically actuated slips of the liner hanger system based on the subset of the data comprising the block position and the hook load, the turn of the running string to disengage the running string from the lining string based on the subset of the data comprising the revolutions per minute, the confirmation of the running string being released from the lining string based on the subset of the data comprising the block position and the hook load, the ball seat of the running string being sheared from the liner hanger system based on the standpipe pressure, and the liner top packer being set within the borehole based on the subset of the data comprising the block position and the hook load.

* * * * *